US012716002B2

(12) United States Patent
Ruiz Gomez et al.

(10) Patent No.: US 12,716,002 B2
(45) Date of Patent: Aug. 25, 2026

(54) CASTING LACQUER FOR SCREEN PRINTING

(71) Applicants: BASF SE, Ludwigshafen am Rhein (DE); De La Rue International Limited, Basingstoke (GB)

(72) Inventors: Gloria Ruiz Gomez, Basel (CH); Michelle Richert, Basel (CH); Alice Mesnage, Basingstoke (GB); John Godfrey, Basingstoke (GB); David Ellis, Basingstoke (GB)

(73) Assignees: De La Rue International Limited, Basingstoke (GB); BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/845,008

(22) PCT Filed: Mar. 8, 2023

(86) PCT No.: PCT/EP2023/055868
§ 371 (c)(1),
(2) Date: Sep. 9, 2024

(87) PCT Pub. No.: WO2023/170132
PCT Pub. Date: Sep. 14, 2023

(65) Prior Publication Data

US 2025/0263566 A1 Aug. 21, 2025

(30) Foreign Application Priority Data

Mar. 10, 2022 (EP) .................................... 22161349

(51) Int. Cl.
*C09D 11/101* (2014.01)
*B41F 15/08* (2006.01)
(Continued)

(52) U.S. Cl.
CPC ........ *C09D 11/101* (2013.01); *B41F 15/0809* (2013.01); *B41M 7/009* (2013.01);
(Continued)

(58) Field of Classification Search
None
See application file for complete search history.

(56) References Cited

U.S. PATENT DOCUMENTS 3,862,333 A 1/1975 Chalupa et al.
4,151,175 A 4/1979 Crivello et al.
(Continued)

FOREIGN PATENT DOCUMENTS

EP 0092269 A1 10/1983
EP 0341002 A2 11/1989
(Continued)

OTHER PUBLICATIONS

International Preliminary Report on Patentability received for PCT Patent Application No. PCT/EP2023/055868, mailed on Jun. 26, 2024, 08 pages.
(Continued)

*Primary Examiner* — Peter A Salamon
(74) *Attorney, Agent, or Firm* — Faegre Drinker Biddle & Reath LLP

(57) ABSTRACT

The present invention relates to a radiation curable screen printing composition for cast-curing comprising one or more compounds comprising radiation curable groups, one or more photoinitiators and one or more rheology modifying agents, which composition has a specific shear rate dependent viscosity; an article comprising a substrate and a coating comprising the radiation curable composition in cured form, wherein the coating is in form of a surface relief structure, a method for producing the article comprising the
(Continued)

steps: (i) Providing a casting tool having a relief structure defined in a surface thereof, the relief structure corresponding to the surface relief structure; (ii) Applying to the substrate and/or the relief structure of the casting tool the radiation curable composition; (iii) Cast curing the radiation curable composition by bringing the substrate into contact with a casting tool comprising a relief structure and forming the surface relief structure in the coating composition; and (iv) Radiation curing the coating composition such that the surface relief structure formed of the radiation curable composition is retained on the substrate; a security article comprising at least one inventive substrate; the use of the inventive radiation curable composition for the preparation of a surface relief structure on a substrate; the use of the radiation curable composition for screen printing, preferably rotary screen printing, and preferably subsequent cast curing; and a printing press comprising the radiation curable composition, wherein the printing press is adapted to carry out printing on a web-like or sheet-like substrate, in particular for the production of security articles such as banknotes, comprising a printing unit, preferably a screen-printing unit, the printing press further comprises an in-line casting device comprising a casting tool, wherein the printing unit is designed to apply the radiation curable composition to the substrate and/or the casting tool and the inline-casting device is adapted to replicate and form a surface relief structure in the radiation curable composition.

24 Claims, 6 Drawing Sheets

(51) Int. Cl.
*B41M 7/00* (2006.01)
*C08K 3/36* (2006.01)
*C08K 9/06* (2006.01)

(52) U.S. Cl.
CPC .................. *C08K 3/36* (2013.01); *C08K 9/06* (2013.01); *C08K 2201/006* (2013.01)

(56) References Cited

U.S. PATENT DOCUMENTS 4,399,071 A 8/1983 Crivello et al.
4,434,010 A 2/1984 Ash
4,694,029 A 9/1987 Land
4,838,648 A 6/1989 Phillips et al.
4,892,336 A 1/1990 Kaule et al.
5,059,245 A 10/1991 Phillips et al.
5,084,351 A 1/1992 Phillips et al.
5,135,812 A 8/1992 Phillips et al.
5,171,363 A 12/1992 Phillips et al.
5,571,624 A 11/1996 Phillips et al.
5,733,364 A 3/1998 Schmid et al.
6,306,555 B1 10/2001 Schulz et al.
6,428,051 B1 8/2002 Herrmann et al.
6,521,036 B1 2/2003 Bleikolm et al.
6,855,371 B2 2/2005 Gier et al.
6,856,462 B1 2/2005 Scarbrough et al.
9,617,371 B2 4/2017 Leutfeld et al.
9,884,936 B2 2/2018 Gaudl et al.
2003/0167968 A1* 9/2003 Erdmann .............. C07F 9/3821 106/35
2009/0021840 A1 1/2009 Steenblik et al.
2015/0184031 A1* 7/2015 Yurt ....................... B05D 1/305 428/447
2015/0218408 A1 8/2015 Becker et al.
2018/0186166 A1* 7/2018 Holmes .................. B42D 25/45
2020/0148892 A1 5/2020 Haveman et al.
2020/0308426 A1 10/2020 James et al.

FOREIGN PATENT DOCUMENTS

EP 0562897 A1 9/1993
EP 0624826 A1 11/1994
EP 0668329 A2 8/1995
EP 0723501 A1 7/1996
EP 0724519 A1 8/1996
EP 0736073 A1 10/1996
EP 0741170 A1 11/1996
EP 1114102 A1 7/2001
EP 1398174 A1 3/2004
EP 1695121 A2 8/2006
JP 4777739 B2 9/2011
WO 83/00659 A1 3/1983
WO 94/27254 A1 11/1994
WO 95/10419 A1 4/1995
WO 95/17475 A1 6/1995
WO 98/46647 A1 10/1998
WO 00/39391 A1 7/2000
WO 03/54297 A2 7/2003
WO 2006/008251 A2 1/2006
WO 2011/051669 A1 5/2011
WO 2011/051670 A2 5/2011
WO 2011/107782 A1 9/2011
WO 2011/107783 A1 9/2011
WO 2012/027779 A1 3/2012
WO 2017/009616 A1 1/2017
WO 2019/206845 A1 10/2019
WO 2020/020479 A1 1/2020
WO WO-2020152021 A1 * 7/2020 ............... C08K 3/08
WO 2021/175907 A1 9/2021

OTHER PUBLICATIONS

International Search Report and Written Opinion received for PCT Patent Application No. PCT/EP2023/055868, mailed on Jun. 6, 2023, 14 pages.

* cited by examiner

CASTING LACQUER FOR SCREEN PRINTING

CROSS-REFERENCE TO RELATED APPLICATIONS

This application is a National stage application (under 35 U.S.C. § 371) of PCT/EP2023/055868, filed Mar. 8, 2023, which claims benefit of European Application No. 22161349.0, filed Mar. 10, 2022, both of which are incorporated herein by reference in their entirety.

The present invention relates to a radiation curable screen printing composition for cast-curing comprising one or more compounds comprising radiation curable groups, one or more photoinitiators and one or more rheology modifying agents, which composition has a specific shear rate dependent viscosity; an article comprising a substrate and a coating comprising the radiation curable composition in cured form, wherein the coating is in form of a surface relief structure, a method for producing the article comprising the steps: (i) Providing a casting tool having a relief structure defined in a surface thereof, the relief structure corresponding to the surface relief structure; (ii) Applying to the substrate and/or the relief structure of the casting tool the radiation curable composition; (iii) Casting the radiation curable composition by bringing the substrate into contact with a casting tool comprising a relief structure and forming the surface relief structure in the coating composition; and (iv) Radiation curing the coating composition such that the surface relief structure formed of the radiation curable composition is retained on the substrate; a security article comprising at least one inventive substrate; the use of the inventive radiation curable composition for the preparation of a surface relief structure on a substrate; the use of the radiation curable composition for screen printing, preferably rotary screen printing, and preferably subsequent cast-curing; and a printing press comprising the radiation curable composition, wherein the printing press is adapted to carry out printing on a web-like or sheet-like substrate, in particular for the production of security articles such as banknotes, comprising a printing unit, preferably a screen-printing unit, the printing press further comprises an in-line casting device comprising a casting tool and a radiation source, wherein the printing unit is designed to apply the radiation curable composition to the substrate and/or the casting tool and the inline-casting device is adapted to replicate and form a surface relief structure in the radiation curable composition.

Surface relief structures are used for various fields of application. One important field is the provision of security articles including security documents. To prevent counterfeiting and to enable authenticity to be checked, security documents are typically provided with one or more security devices which are difficult or impossible to replicate accurately with commonly available means such as photocopiers, scanners or commercial printers.

Such surface relief structures can be obtained by different methods.

According to "Sol-gel technologies for glass producers and users" edited by Michael A. Aegerter and Martin Menning, 2004, chapter 2.4.2 "Embossing" by M. Menning, P. W. Oliveira, H. Schmidt, pages 109-112, there are basically three different embossing techniques: hot embossing, reactive embossing and thixotropic embossing.

The hot embossing process is used for the micropatterning of thermoplastic materials. Usually, both the material and the stamper are heated up to temperatures well above the transition temperature of the material before the stamper is pressed onto it. Before removing the stamper, the patterned layer has to be cooled down in order to avoid a deformation of the surface relief by a viscous flow process.

In reactive embossing, the stamper or master roll is pressed onto a low viscosity, liquid layer of organic monomers (mostly acrylates), uncured organic-inorganic hybrid materials or organic-inorganic nanocomposites respectively. In all cases the embossed micropattern has to be fixed by curing the material (mostly by UV-irradiation) underneath the stamper.

In thixotropic embossing, the material to be embossed has to have a thixotropic behavior. When the stamper or embossing roll is pressed onto it, a high shear stress is applied and the viscosity of the material decreases and the surface relief of the stamper is easily filled with the embossing material. When the stamper is moved out of the material, the shear load decreases and, consequently, the viscosity increases drastically. Due to this high viscosity, the surface relief of the embossed layer can be conserved for the short time span between the removing of the stamper and the final curing.

US 2020/0148892 A1 discloses a casting resin composition comprising or consisting of:

(a) a monomer capable of forming a casting resin upon polymerisation and (b) at least one thixotropic agent, wherein said at least one thixotropic agent is an urea urethane; and the use of an urea urethane as a thixotropic agent in a casting resin composition for making casting resins, such as for example transformers, isolators, capacitors, semiconductors, cables, muffles, prototypes and coatings. However, US2020/0148892A1 does not mention casting compositions suitable for providing surface relief structures by cast curing.

U.S. Pat. No. 6,855,371 B2 discloses a thixotropic embossing, i.e. a method of producing a microstructured surface relief by applying to a substrate a coating composition which is thixotropic or which acquires thixotropic properties by pretreatment on the substrate, embossing the surface relief into the applied thixotropic coating composition with an embossing device, and curing, wherein curing takes place only when the embossing device has been removed from the coating composition.

WO 2019/206845 A1 discloses a process for the production of strongly adherent (embossed) films on flexible substrates, security elements, obtainable by the process and security documents, comprising the security elements. By coating a flexible substrate first with a primer layer and then with an embossed film the adherence of the embossed film to the substrate is improved while keeping the optical performance of the embossed film. A surface relief structure is obtained in WO 2019/206845 A1 by reactive embossing.

WO 2020/020479 A1 discloses the use of a paint composition that can be cured by radiation for producing micro-optical structures, said paint composition containing i) at least one compound that can be cured by radiation, ii) at least one chain transfer reagent and iii) at least one reactive diluent, selected from dipropylene glycol diacrylate, tricyclodecane dimethanol diacrylate, tricyclodecane dimethanol dimethacrylate, esterdiol diacrylate, polyethylene glycol diacrylate, tetraethylene glycol diacrylate, 3-methyl-1,5-pentanediol diacrylate, decanediol diacrylate, 1,6-hexanediol diacrylate, trimethylolpropane triacrylate, tripropylene glycol diacrylate, and ethoxylated derivatives of the aforementioned reactive diluents, wherein the viscosity of the paint composition that can be cured by radiation is less than 1000 mPa S at a temperature of 20° C., measured in accordance with EN ISO 3219:1994, for producing micro-optical or nano-optical structures. A surface relief structure is obtained in WO 2020/020479 A1 by reactive embossing.

WO 2021/175907 A1 relates to the field of security inks suitable for printing security features on substrates, in particular on security documents or articles as well as security features made from said security inks, and security documents comprising a security feature made from said security inks. WO 2021/175907 A1 provides UV-Vis radiation cationically curable security inks and UV-Vis radiation curable hybrid security inks comprising an ink vehicle and pigments comprising a flake-shaped non-metallic or metallic substrate comprising one or more at least partial coating layers, an at least partial surface treatment layer made of one or more surface modifiers based on perfluoropolyethers.

Figure 1:
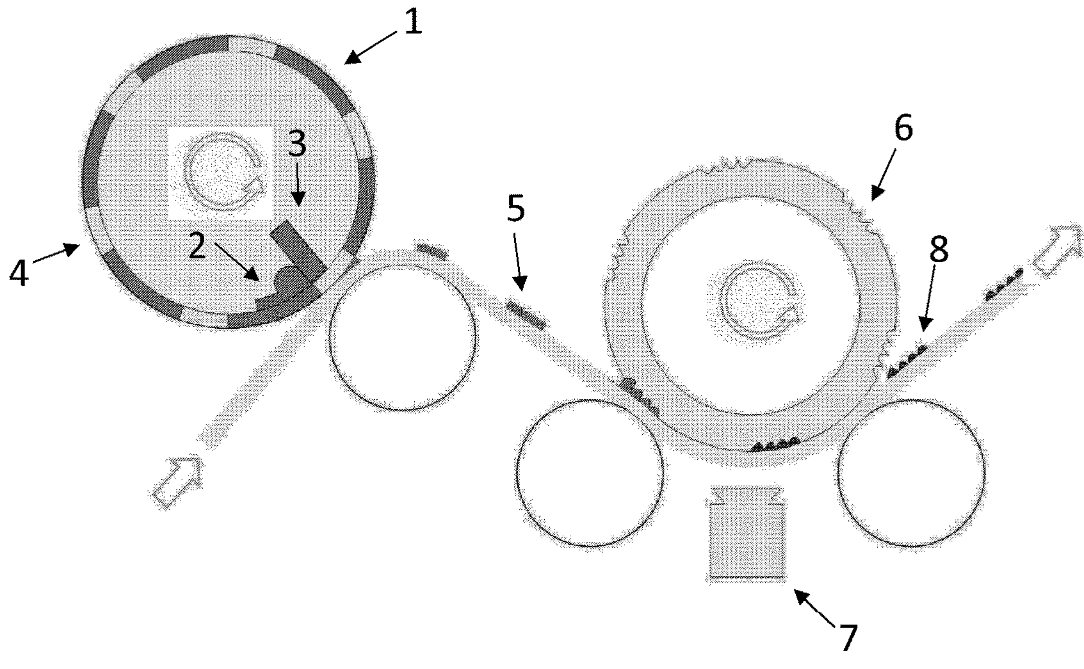
FIG. 1 illustrates a screen printing unit applying the radiation curable composition to a web.

An example for a cast-curing process is described in WO 2017/009616 A1. Said document discloses a method for providing surface relief structures with dimensions in the μm range and comprises (a) the provision of a casting tool having a relief structure defined in a surface thereof, the relief structure corresponding to the surface relief structure; (b) application to the substrate and/or the relief structure of the casting tool a radiation curable composition; (c) bringing the substrate into contact with a casting tool comprising a relief structure and forming the surface relief structure in the coating composition; and (d) curing the coating composition such that the surface relief structure formed of the radiation curable composition is retained on the substrate.

The inventors of the present application found that the application of the radiation curable composition (corresponding to step (b) of the method mentioned above) can be achieved by screen printing, preferably by rotary screen printing, especially in the case of sheet printing.

The different steps in the cast curing process for providing surface relief structures especially with dimensions in the μm range place high demands on the radiation curable composition.

For example:

In the casting step (corresponding to step (c) of the method mentioned above) radiation curable compositions having a very low viscosity are required. The resin (i.e. the radiation curable composition) needs to fill the recesses in the relief structure of the casting tool to enable successful structure embossing and replication at high speed.

On the other hand, in the application step (corresponding to step (b) of the method mentioned above) radiation curable compositions having a high viscosity at rest are required. Especially in the case when the application of the radiation curable composition is carried out by rotary screen printing, a composition is needed which allows a high viscosity to prevent leakage from the screen mesh at rest and which additionally allows for a uniform print when passed through the screen mesh as part of the method mentioned above.

It is an object of the present invention to provide a radiation curable composition fulfilling the demands mentioned above. The radiation curable composition should be especially adapted to a cast-curing method, wherein the radiation curable composition is applied to the casting tool and/or to the substrate (see for example application step (b) above) by screen printing, preferably by rotary screen printing.

The object is achieved by the provision of a radiation curable, preferably UV curable, screen printing composition for cast-curing comprising a) one or more compounds comprising radiation curable, preferably UV curable, groups, preferably selected from compounds comprising free radically curable groups, e.g. photo-crosslinkable (meth)acrylate or aromatic vinyl groups, compounds comprising cationically curable groups, e.g. cycloaliphatic epoxides, and combinations of compounds comprising free radically curable groups and cationically curable groups as component A,
b) one or more photoinitiators as component B,
c) one or more rheology modifying agents as component C,
d) optionally one or more defoaming agents as component D,
e) optionally one or more adhesion promoters as component E,
f) optionally one or more functional material, as component F, which composition has a shear rate dependent viscosity, preferably a shear rate and time dependent viscosity, wherein the viscosity at 35° C. is 15 to 40 Pa S, preferably 15 to 35 Pa S at a shear rate of 0.1 $s^{-1}$ and the viscosity at 35° C. is <0.15 Pa S at a shear rate of 1000 $s^{-1}$, determined according to ISO 3219-2:2021, by a TA Instruments AR-2000 Rheometer using a truncated cone of 60 mm 2° stainless steel and plate geometry, and measurements are conducted in the rotational mode using shear rate control.

In a further embodiment, the object is achieved by the provision of a radiation curable, preferably UV curable, screen printing composition for cast-curing comprising a) one or more compounds comprising radiation curable, preferably UV curable, groups, preferably selected from compounds comprising free radically curable groups, e.g. photo-crosslinkable (meth)acrylate or aromatic vinyl groups, compounds comprising cationically curable groups, e.g. cycloaliphatic epoxides, and combinations of compounds comprising free radically curable groups and cationically curable groups as component A,
b) one or more photoinitiators as component B,
c) one rheology modifying agent as component C,
d) optionally one or more defoaming agents as component D,
e) optionally one or more adhesion promoters as component E,
f) optionally one or more functional material, as component F, wherein component C is based a hydrophilic fumed silica, preferably with a BET specific surface area from 50 to 500 $m^2/g$ and more preferably from 150 to 250 $m^2/g$.

It has been found that the radiation curable composition having a specific shear rate dependent viscosity or a specific rheology modifying agent (component C), respectively, is particularly useful for reactive cast-curing, especially wherein the step of application of the radiation curable composition to the substrate and/or the relief structure of the casting tool is carried out by screen printing, preferably by rotary screen printing.

A further subject matter of the present invention is an article comprising a substrate and a coating comprising a radiation cured composition according to the present invention, wherein the coating is in form of a surface relief structure; a method for producing the article comprising the steps: (i) Providing a casting tool having a relief structure defined in a surface thereof, the relief structure corresponding to the surface relief structure; (ii) Applying to the substrate and/or the relief structure of the casting tool the radiation curable composition; (iii) Casting the radiation curable composition by bringing the substrate into contact with a casting tool comprising a relief structure and forming the surface relief structure in the coating composition; and (iv) Radiation curing the coating composition such that the surface relief structure formed of the radiation curable composition is retained on the substrate; a security article such as a security document comprising at least one inventive article; the use of the inventive radiation curable composition for the preparation of a surface relief structure on a substrate; the use of the radiation curable composition for screen printing, preferably rotary screen printing, and preferably subsequent cast-curing; and a printing press comprising the radiation curable composition, wherein the printing press is adapted to carry out printing on a web-like or sheet-like substrate, in particular for the production of security articles such as security documents such as banknotes, comprising a printing unit, preferably a screen-printing unit, the printing press further comprises an in-line casting device comprising a casting tool and a radiation source, wherein the printing unit is designed to apply the radiation curable composition to the substrate and/or the casting tool and the inline-casting device is adapted to replicate and form a surface relief structure in the radiation curable composition.

A further subject matter of the present invention is that the printing press above is further adapted to carry out preceding and/or subsequent print processes in register with surface relief structure, wherein the printing press comprises one or more additional printing units such as in-line flexographic, gravure, lithographic, offset, inkjet, and/or additional screen printing units, wherein the in-line additional printing units can be configured to print sequentially or simultaneously.

A further subject matter of the present invention is that the substrate (mentioned above) comprises a first and a second side and surface relief structure takes the form of a micro-optic structure and the additional printing units apply at least one corresponding printed pattern on the second side of the substrate in register with the micro-optical structure.

The surface relief structure according to the present invention is a surface structure defining a plurality of peaks and troughs of any type, form and topology. For example, the surface relief structure can be one of; a diffractive structure; one or more micro-optic elements such as focussing elements, magnifying elements, faceted elements, reflective elements, or caustic elements; or a macro-structure, for example a tactile structure that enables the structure to be detected by touch. Preferably, the surface relief structure is present in form of a nanostructure or microstructure.

Screen printing (also referred in the art as silkscreen printing) is a printing technique that typically uses a screen made of woven mesh to support an ink-blocking stencil. The attached stencil forms open areas of mesh that transfer ink as a sharp edged image onto a substrate. A squeegee is moved across the screen with ink-blocking stencil, forcing ink past the threads of the woven mesh in the open areas. A significant characteristic of screen printing is that a greater thickness of the ink can be applied to the substrate than with other printing techniques. Screen-printing is therefore also preferred when ink deposits with the thickness having a value between about 10 to 50 μm or greater are required which cannot (easily) be achieved with other printing techniques. Generally, a screen is made of a piece of porous, finely woven fabric called mesh stretched over a frame of e.g. aluminum or wood. Currently most meshes are made of man-made materials such as synthetic or steel threads. Preferred synthetic materials are nylon or polyester threads.

In addition to screens made on the basis of a woven mesh based on synthetic or metal threads, screens have been developed out of a solid metal sheet with a grid of holes. Such screens are prepared by a process comprising of electrolytically forming a metal screen by forming in a first electrolytic bath a screen skeleton upon a matrix provided with a separating agent, stripping the formed screen skeleton from the matrix and subjecting the screen skeleton to an electrolysis in a second electrolytic bath in order to deposit metal onto said skeleton.

There are three types of screen printing presses, namely flat-bed, cylinder and rotary screen printing presses. Flat-bed and cylinder screen printing presses are similar in that both use a flat screen and a three-step reciprocating process to perform the printing operation. The screen is first moved into position over the substrate, the squeegee is then pressed against the mesh and drawn over the image area, and then the screen is lifted away from the substrate to complete the process. With a flat-bed press the substrate to be printed is typically positioned on a horizontal print bed that is parallel to the screen. With a cylinder press the substrate is mounted on a cylinder. Flat-bed and cylinder screen printing processes are discontinuous processes, and consequently limited in speed which is generally at maximum 45 m/min in web or 3'000 sheets/hour in a sheet-fed process.

Conversely, rotary screen presses are designed for continuous, high speed printing. The screens used on rotary screen presses are for instance thin metal cylinders that are usually obtained using the electroforming method described hereabove or made of woven steel threads. The open-ended cylinders are capped at both ends and fitted into blocks at the side of the press. During printing, ink is pumped into one end of the cylinder so that a fresh supply is constantly maintained. The squeegee is fixed inside the rotating screen and squeegee pressure is maintained and adjusted to allow a good and constant print quality. The advantage of rotary screen presses is the speed which can reach easily ≥120 m/min in web or ≥8'000 sheets/hour in a sheet-fed process.

Screen printing is further described for example in *The Printing Ink Manual*, R. H. Leach and R. J. Pierce, Springer Edition, 5th Edition, pages 58-62, in *Printing Technology*, J. M. Adams and P. A. Dolin, Delmar Thomson Learning, 5th Edition, pages 293-328 and in *Handbook of Print Media*, H. Kipphan, Springer, pages 409-422 and pages 498-499.

Component A

A radiation curable composition is according to the present invention generally a free radically curable composition and/or a cationically curable composition.

Compounds comprising free radical cure groups are typically compounds comprising photo-crosslinkable (meth) acrylate or aromatic vinyl groups, i.e. compounds comprising groups which cross-link through use of a photoinitiator activated by the radiation source employed e.g. UV. Suitable compounds are generally known by a person skilled in the art.

Compounds comprising cationic cure groups are typically cycloaliphatic epoxides, in which generally ring opening is effected using photo initiators or catalysts which generate ionic entities under the radiation source employed e.g. UV. The ring opening is followed by intermolecular crosslinking. Suitable compounds are generally known by a person skilled in the art.

The radiation source is generally high-energy light, for example, UV/VIS radiation, or electron beams. The radiation cure is accomplished by exposure to high-energy radiation, i.e., UV/VIS radiation, preferably light in the wavelength range of 200 to 700 nm, more preferably 200 to 500 nm, or by exposure to high-energy electrons (electron beams; 60 to 300 keV). Examples of radiation sources used include high-pressure mercury vapor lamps, lasers, pulsed lamps (flash light), halogen lamps, UV LEDs, or excimer lamps. The radiation dose normally sufficient for crosslinking in the case of UV curing is in the range from 30 to 3000 $mJ/cm^2$.

The radiation curable composition according to the present invention is preferably a UV curable composition, i.e. a composition curable by UV/VIS radiation.

Suitable compounds comprising radiation curable, preferably UV curable, groups are preferably selected from compounds comprising free radical cure groups, e.g. compounds comprising pho-tocrosslinkable (meth)acrylate or aromatic vinyl groups, compounds comprising cationic cure groups, e.g. cycloaliphatic epoxides, and combinations of compounds comprising free radical cure groups and cationic cure groups.

Preferably, component A comprises a1) one or more (meth)acrylates, preferably a1i) one or more epoxy (meth)acrylates, polyester acrylates and/or polyether acrylates as component A1, and a2ii) one or more monofunctional or multifunctional (meth)acrylates as component A2; and/or a2) one or more cycloaliphatic epoxides, preferably, the one or more cycloaliphatic epoxides comprise at least one cyclohexane group, and at least two epoxide groups.

In one preferred embodiment, component A comprises one or more (meth)acrylates.

In the context of the present application the term (meth) acrylate has the meaning: acrylate and/or methacrylate.

Examples (meth)acrylates are alkyl, hydroxyalkyl or amino acrylates, or alkyl, hydroxyalkyl or amino methacrylates, for example methyl, ethyl, butyl, 2-ethylhexyl or 2-hydroxyethyl acrylate, isobornyl acrylate, methyl methacrylate or ethyl methacrylate. Silicone acrylates are also suitable.

Further examples are the diacrylates of ethylene glycol, propylene glycol, neopentyl glycol, hexamethylene glycol or of bisphenol A, and 4,4'-bis(2-acryl-oyloxyethoxy)diphenylpropane, trimethylolpropane triacrylate, pentaerythritol triacrylate or tetraacrylate or vinyl acrylate.

Examples of (meth)acrylates of relatively high to high molecular mass (oligomers and polymers) are acrylated epoxy resins, polyesters containing acrylate-groups and polymers and copolymers containing (meth)acrylic groups in the side chains, and also mixtures of one or more such oligomers and polymers.

Examples of unsaturated carboxylic acids are acrylic acid, methacrylic acid, crotonic acid, itaconic acid, cinnamic acid, and unsaturated fatty acids such as linolenic acid or oleic acid. Acrylic and methacrylic acid are preferred.

Further suitable are polyhydroxyalkyl methacrylates or copolymers thereof.

Examples of (meth)acrylate esters of polyols are: trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, ethylene glycol diacrylate, 1,3-butanediol diacrylate, 1,3-butanediol dimethacrylate, sorbitol triacrylate, sorbitol tetraacrylate, pentaerythritol-modified triacrylate, sorbitol tetramethacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, or mixtures thereof.

Also suitable are triacrylate of singly to vigintuply alkoxylated, more preferably singly to vigintuply ethoxylated trimethylolpropane, singly to vigintuply propoxylated glycerol or singly to vigintuply ethoxylated and/or propoxylated pentaerythritol, such as, for example, ethoxylated trimethylol propane triacrylate (TMEOPTA).

Also suitable as polymerizable components are the amides (meth)acrylic acid with aromatic, cycloaliphatic and aliphatic polyamines having preferably 2 to 6, especially 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, do-decylenediamine, 1,4-diaminocyclohexane, isophoronediamine, phenylenediamine, bis phenylenediamine, di-β-aminoethyl ether, diethylenetriamine, triethylenetetramine, di(β-ami-noethoxy)- or di(β-aminopropoxy) ethane. Other suitable polyamines are polymers and copolymers, preferably with additional amino groups in the side chain, and oligoamides having amino end groups. Examples of such unsaturated amides are methylenebisacrylamide, 1,6-hexamethylenebisacrylamide, diethylenetriaminetrismethacrylamide, bis(methacrylamidopropoxy) ethane, β-methacrylamidoethyl methacrylate and N [(β-hydroxy ethoxy)-ethyl]acrylamide.

Polymers with (meth)acrylate groups in the side chain are likewise known. They may, for example, be reaction products of epoxy resins based on novolaks with (meth)acrylic acid, or may be homo- or copolymers of vinyl alcohol or hydroxyalkyl derivatives thereof which are esterified with (meth)acrylic acid, or may be homo- and copolymers of (meth)acrylates which are esterified with hydroxyalkyl (meth)acrylates.

Other suitable polymers with acrylate or methacrylate groups in the side chains are, for example, solvent soluble or alkaline soluble polyimide precursors, for example poly (amic acid ester) compounds, having the photopolymerizable side groups either attached to the backbone or to the ester groups in the molecule, i.e. according to EP624826. Such oligomers or polymers can be formulated with optionally reactive diluents, like polyfunctional (meth)acrylates in order to prepare highly sensitive polyimide precursor resists.

The compound comprising (meth)acrylate groups, may also comprise urethane (meth)acrylates, epoxy (meth)acrylates or carbonate (meth)acrylates.

Urethane (meth)acrylates are obtainable for example by reacting polyisocyanates with hydroxyalkyl (meth)acrylates and optionally chain extenders such as diols, polyols, diamines, polyamines, dithiols or polythiols.

The urethane (meth)acrylates preferably have a number-average molar weight Mn of 500 to 20 000, in particular of 500 to 10 000 and more preferably 600 to 3000 g/mol (determined by gel permeation chromatography using tetrahydrofuran as eluent and polystyrene as standard). The urethane (meth)acrylates preferably have a (meth)acrylic group content of 1 to 5, more preferably of 2 to 4, mol per 1000 g of urethane (meth)acrylate.

Epoxy (meth)acrylates are obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers.

Examples of possible epoxidized olefins include ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris [4-(2,3-epoxypropoxy)phenyl]methane isomers (CAS No. [66072-39-7]), phenol-based epoxy novolaks (CAS No. [9003-35-4]), and cresol-based epoxy novolaks (CAS No. [37382-79-9]).

Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl] ethane (CAS No. [27043-37-4]), diglycidyl ether of polypropylene glycol (a,00-bis(2,3-epoxypropoxy)poly (oxypropylene), CAS No. [16096-30-3]) and of hydrogenated bisphenol A (2,2-bis[4-(2,3-epoxypropoxy)cyclohexyl]propane, CAS No. [13410-58-7]).

The epoxy (meth)acrylates preferably have a number-average molar weight Mn of 200 to 20 000, more preferably of 200 to 10 000 g/mol, and very preferably of 250 to 3000 g/mol; the amount of (meth)acrylic groups is preferably 1 to 5, more preferably 2 to 4, per 1000 g of epoxy (meth) acrylate (determined by gel permeation chromatography using polystyrene as standard and tetrahydrofuran as eluent).

Carbonate (meth)acrylates comprise on average preferably 1 to 5, especially 2 to 4, more preferably 2 to 3 (meth)acrylic groups, and very preferably 2 (meth)acrylic groups.

The number-average molecular weight Mn of the carbonate (meth)acrylates is preferably less than 3000 g/mol, more preferably less than 1500 g/mol, very preferably less than 800 g/mol (determined by gel permeation chromatography using polystyrene as standard, tetrahydrofuran as eluent).

The carbonate (meth)acrylates are obtainable in a simple manner by transesterifying carbonic esters with polyhydric, preferably dihydric, alcohols (diols, hexanediol for example) and subsequently esterifying the free OH groups with (meth)acrylic acid, or else by transesterification with (meth)acrylic esters, as described for example in EP-A 92 269. They are also obtainable by reacting phosgene, urea derivatives with polyhydric, e.g., dihydric, alcohols.

Also conceivable are (meth)acrylates of polycarbonate polyols, such as the reaction product of one of the aforementioned diols or polyols and a carbonic ester and also a hydroxyl-containing (meth)acrylate.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl (meth)acrylate, 2-or 3-hydroxypropyl (meth)acrylate, 1,4-butanediol mono(meth)acrylate, neopentyl glycol mono(meth)acrylate, glyceryl mono- and di(meth)acrylate, trimethylolpropane mono- and di(meth) acrylate, and pentaerythritol mono-, di-, and tri (meth) acrylate.

Suitable carbonate (meth)acrylates are those of the formula:

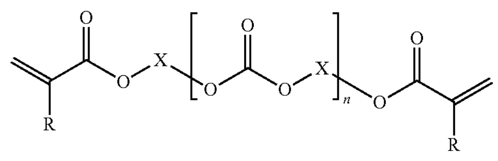

in which R is H or $CH_3$, X is a C2-C18 alkylene group, and n is an integer from 1 to 5, preferably 1 to 3.

R is preferably H and X is preferably C2 to C10 alkylene, examples being 1,2-ethylene, 1,2-propylene, 1,3-propylene, 1,4-butylene, and 1,6-hexylene, more preferably C4 to C8 alkylene.

With very particular preference X is C6 alkylene.

The carbonate (meth)acrylates are preferably aliphatic carbonate (meth)acrylates.

More preferably, component A comprises a1i) one or more epoxy (meth)acrylates, polyester acrylates and/or polyether acrylates, preferably epoxy (meth)acrylates, as component A1, and a1ii) one or more monofunctional or multifunctional (meth)acrylates as component A2.

Suitable epoxy (meth)acrylates, polyester acrylates and/or polyether acrylates and monofunctional or multifunctional (meth)acrylates are mentioned above.

As diluent, a mono- or multi-functional ethylenically unsaturated compound, or mixtures of several of said compounds, can be included in the inventive composition up to 70% by weight based on the solid portion of the composition.

The invention also provides compositions comprising as polymerizable component at least one compound comprising radiation curable groups which is emulsified or dissolved in water, or organic solvents.

The compound comprising radiation curable groups can also be used in admixture with nonphotopolymerizable, film-forming components. These may, for example, be physically drying polymers or solutions thereof in organic solvents, for instance nitrocellulose or cellulose acetobutyrate. They may also, however, be chemically and/or thermally curable (heat-curable) resins, examples being polyisocyanates, polyepoxides and melamine resins, as well as polyimide precursors. The use of heat-curable resins at the same time is important for use in systems known as hybrid systems, which in a first stage are photopolymerized and in a second stage are crosslinked by means of thermal aftertreatment.

Preferably, component A1 is represented by one or more epoxy (meth)acrylates.

Preferred epoxy (meth)acrylates A1 are (meth)acrylates based on aromatic or aliphatic glycidyl ethers, preferably bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene, tris[4-(2,3-epoxypropoxy)phenyl]methane isomers, phenol-based epoxy novolaks, and cresol-based epoxy novolaks, 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane, diglycidyl ether of polypropylene glycol (α,ω-bis(2,3-epoxypro-poxy)poly(oxypropylene), and of hydrogenated bisphenol A (2,2-bis[4-(2,3-epoxypropoxy)cyclohexyl]propane), and mixtures thereof, more preferably, the epoxy (meth)acrylate A1 is bisphenol A epoxy acrylate.

Preferred monofunctional or multifunctional (meth)acrylates A2 are selected from trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, triacrylate of singly to vigintuply alkoxylated, more preferably singly to vigintuply ethoxylated trimethylolpropane, singly to vigintuply propoxylated glycerol or singly to vigintuply ethoxylated and/or propoxylated pentaerythritol, for example, ethoxylated trimethylol propane triacrylate (TMEOPTA) and mixtures thereof. Preferred monofunctional or multifunctional (meth)acrylates A2 are tripropylene glycol diacrylate (TPGDA), dipropylene glycol diacrylate (DPGDA), ethoxylated trimethylol propane triacrylate (TMEOPTA) or mixtures thereof.

Component A is generally present in the radiation curable composition according to the present invention in an amount of 41 to 99 wt %, preferably 80 to 97 wt. %, more preferably 89 to 95 wt %, based on the total amount (100 wt %) of the inventive composition.

More preferably, component A1 is generally present in an amount of 1 to 58.5 wt %, preferably 15 to 40 wt. %, more preferably 20 to 36 wt %, and component A2 is generally present in an amount of 40 to 95 wt %, preferably 45 to 80 wt. %, more preferably 50 to 70 wt %, based on the total amount (100 wt %) of the inventive composition.

In one further preferred embodiment, component A comprises one or more cycloaliphatic epoxides, preferably, the one or more cycloaliphatic epoxides comprise at least one cyclohexane group, and at least two epoxide groups.

The cycloaliphatic epoxides may be difunctional or polyfunctional, preferably the one or more cycloaliphatic epoxides comprising at least one cyclohexane group, and at least two epoxide groups are represented by the following formula (I)

(I)

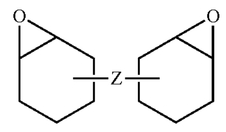

wherein

Z represents a single bond or a divalent group comprising one or more atoms, preferably a single bond, a straight- or branched chain $C_1$-$C_{18}$alkylene group, a divalent alicyclic hydrocarbon group, a cycloalkylene group, —CO—, —O—CO—O—, —COO— or —O—.

Examples of a straight- or branched chain $C_1$-$C_{18}$alkylene group include methylene group, methylmethylene group, dimethylmethylene group, ethylene group, propylene group, and trimethylene group.

Examples of a divalent alicyclic hydrocarbon group or cycloalkyene group include 1,2-cyclopentylene group, 1,3-cyclopentylene group, cyclopentylidene group, 1,2-cyclohexylene group, 1,3-cyclohexylene group, 1,4-cyclohexylene group, and cyclohexylidene group.

According to one embodiment, Z is a divalent group comprising one or more oxygen-containing linking groups selected from —CO—, —O—CO—O—, —COO— and —O—.

Preferred cycloaliphatic epoxides of formula (I) are selected from 3,4-epoxycyclohexylmethyl-3,4-epoxycyclohexane carboxylates, cycloaliphatic diepoxide esters of dicarboxylic acids and 3,4-epoxycyclohexyl-5,5-spiro-3,4-epoxy)cyclohexane-meta-dioxanes.

More preferred cycloaliphatic epoxides of formula (I) are represented by formula (II), (III) or (IV):

(II)

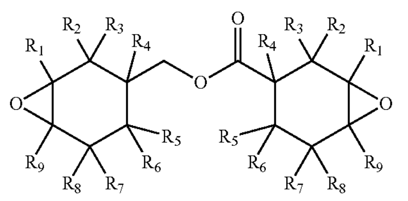

wherein $R_1$ to $R_9$ each independently represent hydrogen or linear or branched $C_1$-$C_{10}$alkyl radicals, preferably hydrogen or linear or branched $C_1$-$C_3$alkyl radicals.

Examples for linear or branched $C_1$-$C_{10}$alkyl radicals are methyl, ethyl, n-propyl, i-propyl, n-butyl, i-butyl, s-butyl, t-butyl, hexyl, octyl, and decyl.

Preferred cycloaliphatic epoxides of formula (II) are 3,4-epoxycyclohexyimethyl-3,4-epoxycyclo-hexanecarboxylate, 3,4-epoxy-6-methyl-cyclohexylmethyl-3,4-epoxy-6-methylcyclohexanecarboxylate, 3,4-epoxy-2-methyl-cyclohexylmethyl-3,4-epoxy-2-methylcyclohexanecarboxylate, and 3,4-epoxy-4-methylcyclohexylmethyl-3,4-epoxy-4-methylcyclohexanecarboxylate;

(III)

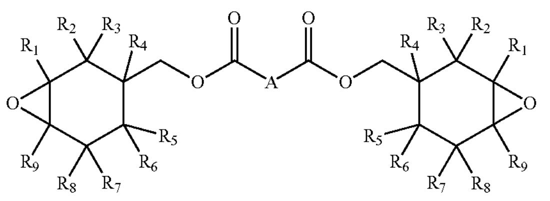

wherein $R_1$ to $R_9$ each independently represent hydrogen or linear or branched $C_1$-$C_{10}$alkyl radicals, preferably hydrogen or linear or branched $C_1$-$C_3$alkyl radicals; and A is a valence bond or a linear or branched divalent $C_1$-$C_{10}$hydrocarbon radical, preferably a valence bond or a linear or branched divalent $C_3$-$C_8$hydrocarbon radical Examples for divalent hydrocarbon radicals are alkylene radicals, for example trimethylene, tetramethylene, hexamethylene and 2-ethylhexylene; and cycloaliphatic radicals, for example 1,4-cyclohexane, 1,3-cyclohexane and 1,2-cyclohexane.

Preferred cycloaliphatic diepoxide esters of dicarboxylic acids of formula (III) are bis(3,4-epoxycyclohexylmethyl) adipate, bis(3,4-epoxy-6-methylcyclohexylmethyl)adipate, bis(3,4-epoxycyclohexylmethyl) oxalate, bis(3,4-epoxycyclohexylmethyl) pimelate, and bis(3,4-epoxycyclohexylmethyl) sebacate;

(IV)

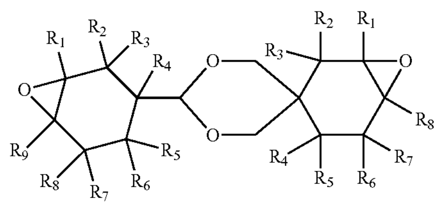

wherein $R_1$ to $R_9$ each independently represent hydrogen or linear or branched $C_1$-$C_8$hydrocarbon radicals.

A preferred example of cycloaliphatic diepoxides having the structural formula (IV) is 2-(3,4-epoxycyclohexyl-5,5-spiro-3,4-epoxy)cyclohexane-meta-dioxane.

Examples for linear or branched $C_1$-$C_{10}$alkyl radicals are methyl, ethyl, n-propyl, i-propyl, n-butyl, i-butyl, s-butyl, t-butyl, hexyl, octyl, and decyl.

According to one embodiment, the cycloaliphatic epoxides of formula (I) are represented by for-mula (V) or (VI):

(V)

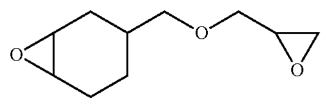

(VI)

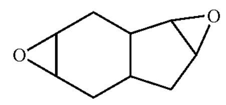

The cycloaliphatic epoxides described herein may be hydroxy modified or (meth)acrylate modified. Examples are commercially available under the name Cyclomer A400 (CAS: 64630-63-3) and Cyclomer M100 (CAS: 82428-30-6) by Daicel Corp., or TTA 15 and TTA16 by TetraChem/Jiangsu.

Component B

The inventive radiation curable composition comprises one or more photoinitiators as component B.

A photoinitiator for the purposes of this specification is a compound which can be cleaved into at least one radical by electromagnetic radiation, preferably by UV radiation, visible light or IR radiation, more preferably by UV radiation or visible light, and very preferably by UV radiation.

Examples of photoinitiators are known to the person skilled in the art and for example published by Kurt Dietliker in "A compilation of photoinitiators commercially available for UV today", Sita Technology Textbook, Edinburgh, London, 2002.

Suitable photoinitiators are described in the following, wherein said photoinitiators are especially useful for radical curing:

Examples of suitable acylphosphine oxide compounds are of the formula XII (XII)

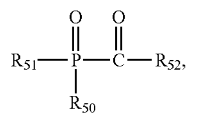

wherein $R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, C1-C12alkyl, C1-C12alkoxy, C1-C12alkylthio or by $NR_{53}R_{54}$;

or $R_{50}$ is unsubstituted C1-C20alkyl or is C1-C20alkyl which is substituted by one or more halogen, C1-C12alkoxy, C1-C12alkylthio, $NR_{53}R_{54}$ or by —(CO)—O—C1-C24alkyl;

$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, C1-C12alkyl, C1-C12alkoxy, C1-C12alkylthio or by $NR_{53}R_{54}$; or $R_{51}$ is —(CO)$R'_{52}$; or $R_{51}$ is C1-C12alkyl which is unsubstituted or substituted by one or more halogen, C1-C12alkoxy, C1-C12alkylthio, or by $NR_{53}R_{54}$;

$R_{52}$ and $R'_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, C1-C4alkyl or C1-C4alkoxy; or $R_{52}$ is a 5- or 6-membered heterocyclic ring comprising an S atom or N atom;

$R_{53}$ and $R_{54}$ independently of one another are hydrogen, unsubstituted C1-C12alkyl or C1-C12alkyl substituted by one or more OH or SH wherein the alkyl chain optionally is interrupted by one to four oxygen atoms; or $R_{53}$ and $R_{54}$ independently of one another are C2-C12-alkenyl, cyclopentyl, cyclohexyl, benzyl or phenyl;

Specific examples are bis(2,4,6-trimethylbenzoyl)-phenylphosphine oxide (Omnirad®819); 2,4,6-trimethylbenzoyl-diphenyl-phosphine oxide (Omnirad®TPO); ethyl (2,4,6-trimethylbenzoyl phenyl) phosphinic acid ester; (2,4,6-trimethylbenzoyl)-2,4-dipentoxyphenylphosphine oxide, bis (2,6-dimethoxybenzoyl)-2,4,4-trimethylpentylphosphine oxide.

(X)

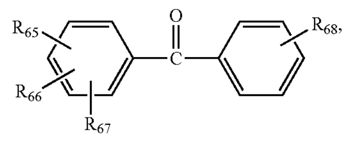

wherein $R_{65}$, $R_{66}$ and $R_{67}$ independently of one another are hydrogen, C1-C4alkyl, C1-C4-halogenalkyl, C1-C4alkoxy, Cl or $N(C1\text{-}C4alkyl)_2$;

$R_{68}$ is hydrogen, C1-C4alkyl, C1-C4halogenalkyl, phenyl, $N(C1\text{-}C4alkyl)_2$, $COOCH_3$,

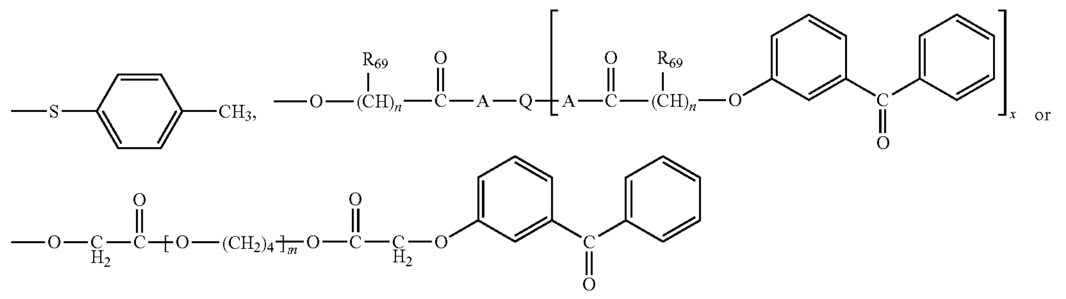

Q is a residue of a polyhydroxy compound having 2 to 6 hydroxy groups;

x is a number greater than 1 but no greater than the number of available hydroxyl groups in Q;

A is $—[O(CH_2)_bCO]_y—$ or $—[O(CH_2)_bCO]_{(y-i)}—[O(CHR_{69}CHR_{69'})_a]_y—$;

$R_{69}$ and $R_{69'}$ independently of one another are hydrogen, methyl or ethyl; and if N is greater than 1 the radicals $R_{69}$ may be the same as or different from each other;

a is a number from 1 to 2;

b is a number from 4 to 5;

y is a number from 1 to 10;

n is 1 to 6; and m is an integer 2 to 10.

Specific examples are Omnirad®BP (=benzophenone), Esacure TZT® available from IGM, (a mixture of 2,4,6-trimethylbenzophenone and 4-methylbenzophenone), 4 phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)benzophenone, 4-(4-tolylthio)benzophenone, 4-benzoyl-N,N,Ntrimethylbenzenemethanamini-umchloride, 2-hydroxy-3-(4-benzoylphenoxy)-N,N,N-trimethyl-1-propanaminium chloride mono-hydrate, 4-(13-acryloyl-1,4,7,10,13-pentaoxatridecyl)benzophenone, 4-benzoyl-N,N-dimethyl-N-[2-(1-oxo-2-propenyl)oxy]ethylben-zenemethanaminium chloride; [4-(2-hydroxy-ethylsulfanyl)-phenyl]-(4-isopropylphenyl)-methanone; biphenyl-[4-(2-hydroxy-ethylsulfanyl)-phenyl]-methanone; bi-phenyl-4-yl-phenyl-methanone; biphenyl-4-yl-p-tolyl-methanone; biphenyl-4-yl-m-tolyl-methanone; [4-(2-hydroxy-ethylsulfanyl)-phenyl]-p-tolyl-methanone; [4-(2-hydroxy-ethylsulfanyl)-phenyl]-(4-isopropyl-phenyl)-methanone; [4-(2-hydroxyethylsulfanyl)-phenyl]-(4-methoxy-phenyl)-methanone; 1-(4-benzoyl-phenoxy)-propan-2-one; [4-(2-hydroxy-ethylsulfanyl)-phenyl]-(4-phe-noxy-phenyl)-methanone; 3-(4-benzoyl-phenyl)-2-dimethylamino-2-methyl-1-phenyl-propan-1-one; (4-chloro-phenyl)-(4-octylsulfanyl-phenyl) methanone; (4-chloro-phenyl)-(4-dodecyl-sulfanylphenyl)-methanone; (4-bromo-phenyl)-(4-octylsulfanyl-phenyl)-methanone; (4-dodecyl-sulfanylphenyl)-(4-methoxy-phenyl)-methanone; (4-benzoyl-phenoxy)-acetic acid methyl ester; biphenyl-[4-(2-hydroxy-ethylsulfanyl)-phenyl]-methanone; 1-[4-(4-benzoylphenylsulfanyl)phenyl]-2-methyl-2-(4-methylphenylsulfonyl) propan-1-one (EsacureR1001 available from IGM).

Examples of suitable alpha-hydroxy ketone, alpha-alkoxyketone or alpha-aminoketone compounds are of the formula (XI)

(XI)

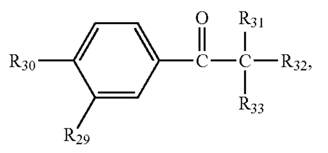

wherein $R_{29}$ is hydrogen or C1-C18alkoxy;

$R_{30}$ is hydrogen, C1-C18alkyl, C1-C12hydroxyalkyl, C1-C18alkoxy, OCH2CH2—$OR_{34}$, morpholino, SC1-C18alkyl, a group —HC═CH2, —C(CH3)═CH2,

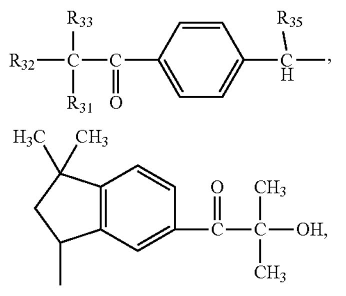

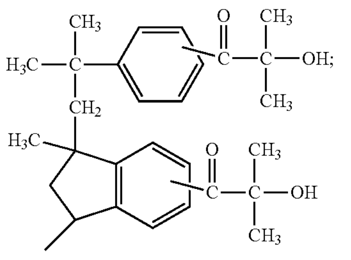

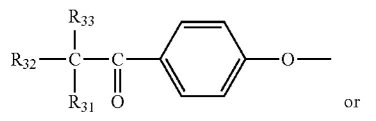

or

-continued

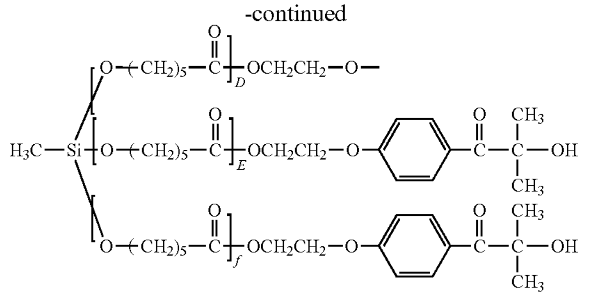

d, e and f are 1-3;

c is 2-10;

G1 and G2 independently of one another are end groups of the polymeric structure, preferably hydrogen or methyl;

$R_{34}$ is hydrogen,

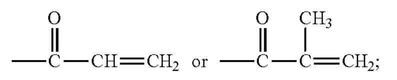

$R_{31}$ is hydroxy, C1-C16alkoxy, morpholino, dimethylamino or —O(CH2CH20)$_g$-C1-C16alkyl; g is 1-20;

$R_{32}$ and $R_{33}$ independently of one another are hydrogen, C1-C16alkyl, C1-C16alkoxy or —O(CH2CH20)$_g$-C1-C16alkyl; or are unsubstituted phenyl or benzyl; or phenyl or benzyl substituted by C1-C12-alkyl; or $R_{32}$ and $R_{33}$ together with the carbon atom to which they are attached form a cyclohexyl ring;

$R_{35}$ is hydrogen, $OR_{36}$ or $NR_{37}R_{38}$;

$R_{36}$ is hydrogen, C1-C13alkyl which optionally is interrupted by one or more non-consecutive O atoms and which uninterrupted or interrupted C1-C16alkyl optionally is substituted by one or more OH, or $R_{36}$ is

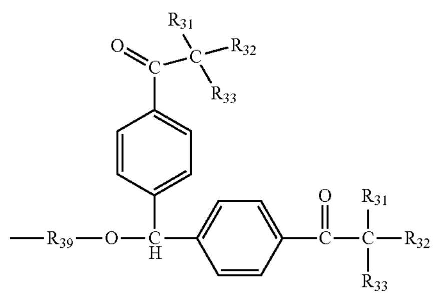

$R_{37}$ and $R_{38}$ independently of each other are hydrogen or C1-C16alkyl which is unsubstituted or is substituted by one or more OH;

$R_{39}$ is C1-C12alkylene which optionally is interrupted by one or more non-consecutive O, —(CO)—NH—C1-C12alkylene-NH—(CO)— or

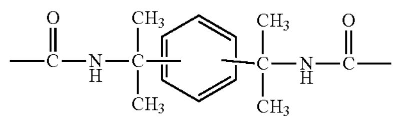

with the proviso that $R_{31}$, $R_{32}$ and $R_{33}$ not all together are C1-C16alkoxy or $—O(CH_2CH_2O)_g$-C1-C16alkyl.

Specific examples are 1-hydroxy-cyclohexyl-phenyl-ketone (Omnirad®184) or Omnirad® 500 (a mixture of Omnirad®184 with benzophenone), 2-methyl-1 [4-(methylthio)phenyl]-2-morpholinopropan-1-one (Omnirad®907), 2-benzyl-2-dimethylamino-1-(4-morpholinophenyl)-butan-1-one (Omnirad®369), 2-dimethylamino-2-(4-methyl-benzyl)-1-(4-morpholin-4-yl-phenyl)-butan-1-one (Omnirad®379), (3,4-dimethoxy-benzoyl)-1-benzyl-1-dimethylamino propane, 1-[4-(2-hydroxyethoxy)-phenyl]-2-hydroxy-2-methyl-1-propan-1-one (Omnirad®2959), 2,2-di-methoxy-1,2-diphenylethan-1-one (Irgacure®651), 2-hydroxy-2-methyl-1-phenyl-propan-1-one (Omnirad®1173), 2-hydroxy-1-{4-[4-(2-hydroxy-2-methyl-propionyl)-benzyl]-phenyl}-2-methyl-propan-1-one (Irgacure®127), 2-hydroxy-1-{4-[4-(2-hydroxy-2-methyl-propionyl)-phenoxy]-phenyl}-2-methylpropan-1-one, Esacure® KIP provided by IGM, 2-hydroxy-1-{1-[4-(2-hydroxy-2-methyl-propionyl)-phenyl]-1,3,3-trimethyl-indan-5-yl}-2-methyl-propan-1-one.

Examples of suitable phenylglyoxylate compounds are of the formula XIII (XIII)

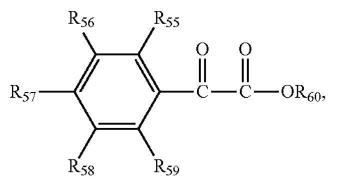

wherein $R_{60}$ is hydrogen, C1-C12alkyl or

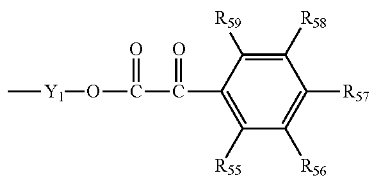

$R_{55}$, $R_{56}$, $R_{57}$, $R_{58}$ and $R_{59}$ independently of one another are hydrogen, unsubstituted C1-C12alkyl or C1-C12alkyl substituted by one or more OH, C1-C4alkoxy, phenyl, naphthyl, halogen or by CN; wherein the alkyl chain optionally is interrupted by one or more oxygen atoms; or $R_{55}$, $R_{56}$, $R_{57}$, $R_{58}$ and $R_{59}$ independently of one another are C1-C4alkoxy, C1-C4alkythio or $NR_{52}R_{53}$; $R_{52}$ and $R_{53}$ independently of one another are hydrogen, unsubstituted C1-C12alkyl or C1-C12alkyl substituted by one or more OH or SH wherein the alkyl chain optionally is interrupted by one to four oxygen atoms; or $R_{52}$ and $R_{53}$ independently of one another are C2-C12-alkenyl, cyclopentyl, cyclohexyl, benzyl or phenyl; and $Y_1$ is C1-C12alkylene optionally interrupted by one or more oxygen atoms.

Specific examples of the compounds of the formula XIII are oxo-phenyl-acetic acid 2-[2-(2-oxo-2-phenyl-acetoxy)-ethoxy]-ethyl ester (Omnirad®754), methyl a-oxo benzeneacetate. Examples of suitable oxime ester compounds are of the formula XIV (XIV)

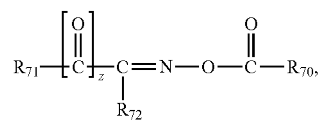

wherein z is 0 or 1;

$R_{70}$ is hydrogen, C3-C8cycloalkyl; C1-C12alkyl which is unsubstituted or substituted by one or more halogen, phenyl or by CN; or $R_{70}$ is C2-C5alkenyl; phenyl which is unsubstituted or substituted by one or more C1-C6alkyl, halogen, CN, $OR_{73}$, $SR_{74}$ or by $NR_{75}R_{76}$; or $R_{70}$ is C1-C8alkoxy, benzyloxy; or phenoxy which is unsubstituted or substituted by one or more C1-C6 alkyl or by halogen;

$R_{71}$ is phenyl, naphthyl, benzoyl or naphthoyl, each of which is substituted by one or more halogen, C1-C12alkyl, C3-C8cycloalkyl, benzyl, phenoxycarbonyl, C2-C12alkoxycarbonyl, $OR_{73}$, $SR_{74}$, $SOR_{74}$, $SO_2R_{74}$ or by $NR_{75}R_{76}$, wherein the substituents $OR_{73}$, $SR_{74}$ and $NR_{75}R_{76}$ optionally form 5- or 6-membered rings via the radicals $R_{73}$, $R_{74}$, $R_{75}$ and/or $R_{76}$ with further substituents on the phenyl or naphthyl ring; or each of which is substituted by phenyl or by phenyl which is substituted by one or more $OR_{73}$, $SR_{74}$ or by $NR_{75}R_{66}$; or $R_{71}$ is thioxanthyl, or

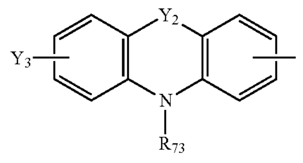

$R_{72}$ is hydrogen; unsubstituted C1-C20alkyl or C1-C20alkyl which is substituted by one or more halogen, $OR_{73}$, $SR_{74}$, C3-C8cycloalkyl or by phenyl; or is C3-C8cycloalkyl; or is phenyl which is unsubstituted or substituted by one or more C1-C6alkyl, phenyl, halogen, $OR_{73}$, $SR_{74}$ or by $NR_{75}R_{76}$; or is C2-C20alkanoyl or benzoyl which is unsubstituted or substituted by one or more C1-C6alkyl, phenyl, $OR_{73}$, $SR_{74}$ or by $NR_{75}R_{76}$; or is C2-C12alkoxycarbonyl, phenoxycarbonyl, CN, $CONR_{75}R_{76}$, $NO_2$, C1-C4haloalkyl, $S(O)_y$-C1-C6alkyl, or $S(O)_y$-phenyl, y is 1 or 2;

$Y_2$ is a direct bond or no bond;

$Y_3$ is $NO_2$ or

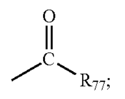

$R_{73}$ and $R_{74}$ independently of one another are hydrogen, C1-C20alkyl, C2-C12alkenyl, C3-C8cycloalkyl, C3-C8cycloalkyl which is interrupted by one or more, preferably 2, O, phenyl-C1 C3alkyl; or are C1-C8alkyl which is substituted by OH, SH, CN, C1-C8alkoxy, C1-C8alkanoyl, C3-C8cycloalkyl, by C3-C8cycloalkyl which is interrupted by one or more O, or which C1-C8alkyl is substituted by benzoyl which is unsubstituted or substituted by one or more C1-C6alkyl, halogen, OH, C1-C4alkoxy or by C1-C4alkylsulfanyl; or are phenyl or naphthyl, each of which is unsubstituted or substituted by halogen, C1-C12alkyl, C1-C12alkoxy, phenyl-C1-C3alkyloxy, phenoxy, C1-C12alkylsulfanyl, phenylsulfanyl, N(C1-C12alkyl)$_2$, diphenylamino or by

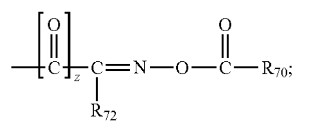

$R_{75}$ and $R_{76}$ independently of each other are hydrogen, C1-C20alkyl, C2-C4hydroxyalkyl, C2-C10alkoxyalkyl, C2-C5alkenyl, C3-C8cycloalkyl, phenyl-C1-C3alkyl, C1-C8alkanoyl, C3-C12alkenoyl, benzoyl; or are phenyl or naphthyl, each of which is unsubstituted or substituted by C1-C12alkyl, benzoyl or by C1-C12alkoxy; or $R_{75}$ and $R_{76}$ together are C2-C6alkylene optionally interrupted by O or $NR_{73}$ and optionally are substituted by hydroxyl, C1-C4alkoxy, C2-C4alkanoyloxy or by benzoyloxy;

$R_{77}$ is C1-C12alkyl, thienyl or phenyl which is unsubstituted or substituted by C1-C12alkyl, $OR_{73}$, morpholino or by N-carbazolyl.

Specific examples are 1,2-octanedione 1-[4-(phenylthio) phenyl]-2-(O-benzoyloxime) (Irgacure® OXE01), ethanone 1-[9-ethyl-6-(2-methylbenzoyl)-9H-carbazol-3-yl]-1-(O-acetyloxime) (Irgacure® OXE02), 9H-thioxanthene-2-carboxaldehyde 9-oxo-2-(0-acetyloxime), ethanone 1-[9-ethyl-6-(4morpholinobenzoyl)-9H-carbazol-3-yl]-1-(O-acetyloxime), ethanone 1-[9-ethyl-6-(2-methyl-4-(2-(1,3-dioxo-2-dimethyl-cyclopent-5-yl) ethoxy)-benzoyl)-9H-carbazol-3-yl]-1-(O-acetyloxime) (Adeka N-1919), ethanone 1-[9-ethyl-6-nitro-9H-carbazol-3-yl]-1-[2-methyl-4-(1-methyl-2-methoxy) ethoxy)phenyl]-1-(O-acetyloxime) (Adeka NCI831), etc.

It is also possible to add cationic photoinitiators, such as benzoyl peroxide (other suitable peroxides are described in U.S. Pat. No. 4,950,581, column 19, lines 17-25), or aromatic sulfonium, phos-phonium or iodonium salts, such as are described, for example, in U.S. Pat. No. 4,950,581, column 18, line 60 to column 19, line 10.

Suitable sulfonium salt compounds are of formula XVa, XVb, XVc, XVd or XVe

XVa

XVb

XVc

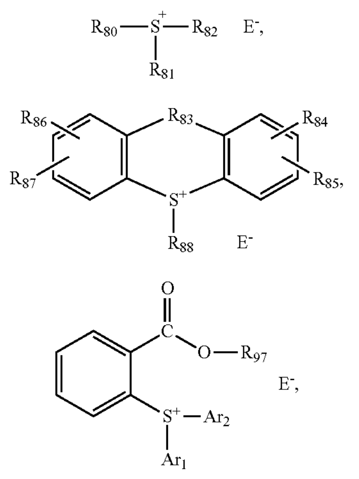

-continued

XVd

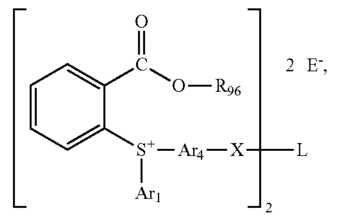

XVe

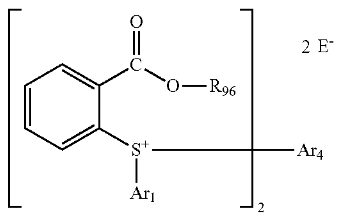

wherein $R_{80}$, $R_{81}$ and $R_{82}$ are each independently of the others unsubstituted phenyl, or phenyl substituted by —S-phenyl,

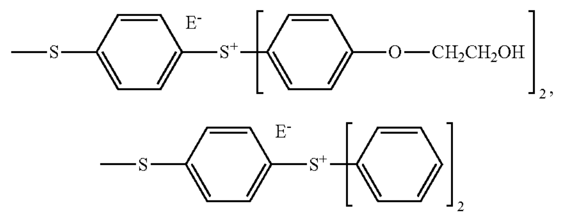

or by

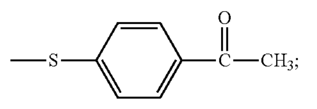

$R_{83}$ is a direct bond, S, O, $CH_2$, $(CH_2)_2$, CO or $NR_{89}$;

$R_{84}$, $R_{85}$, $R_{86}$ and $R_{87}$ independently of one another are hydrogen, C1-C20alkyl, C3-C8cycloalkyl, C1-C20alkoxy, C2-C20alkenyl, CN, OH, halogen, C1-C6alkylthio, phenyl, naphthyl, phenyl-C1-C7alkyl, naphtyl-C1-C3alkyl, phenoxy, naphthyloxy, phenyl-C1-C7alkyloxy, naphtyl-C1-C3alkyloxy, phenyl-C2-C6alkenyl, naphthyl-C2-C4alkenyl, S-phenyl, $(CO)R_{89}$, $O(CO)R_{89}$, $(CO)O\ R_{89}$, $SO_2R_{89}$ or $OSO_2R_{89}$;

$R_{88}$ is C1-C20alkyl, C1-C20hydroxyalkyl,

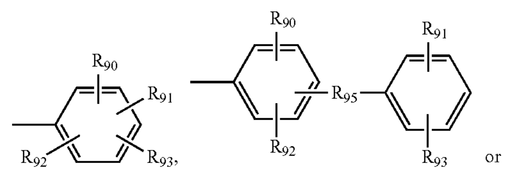

or

-continued

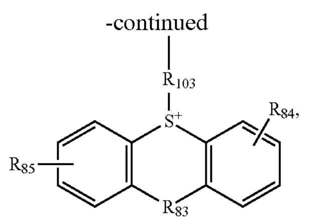

$R_{89}$ is hydrogen, C1-C12alkyl, C1-C12hydroxyalkyl, phenyl, naphthyl or biphenylyl;

$R_{90}$, $R_{91}$, $R_{92}$ and $R_{93}$ independently of one another have one of the meanings as given for $R_{84}$; or $R_{90}$ and $R_{91}$ are joined to form a fused ring system with the benzene rings to which they are attached;

$R_{95}$ is a direct bond, S, O or $CH_2$;

$R_{96}$ is hydrogen, C1-C20alkyl; C2-C20alkyl interrupted by one or more O; or is -L-M-$R_{98}$ or -L-$R_{98}$;

$R_{97}$ has one of the meanings as given for $R_{96}$ or is

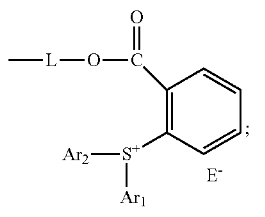

$R_{98}$ is a monovalent sensitizer or photoinitiator moiety;

$Ar_1$ and $Ar_2$ independently of one another are phenyl unsubstituted or substituted by C1-C20alkyl, halogen or $OR_{99}$;

or are unsubstituted naphthyl, anthryl, phenanthryl or biphenylyl;

or are naphthyl, anthryl, phenanthryl or biphenylyl substituted by C1-C20alkyl, OH or $OR_{99}$;

or are —$Ar_4$-$A_1$-$Ar_3$ or

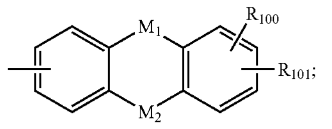

$Ar_3$ is unsubstituted phenyl, naphthyl, anthryl, phenanthryl or biphenylyl;

or is phenyl, naphthyl, anthryl, phenanthryl or biphenylyl substituted by C1-C20alkyl, $OR_{99}$ or benzoyl;

$Ar_4$ is phenylene, naphthylene, anthrylene or phenanthrylene;

$A_1$ is a direct bond, S, O or C1-C20alkylene;

X is CO, C(O) O, OC(O), O, S or $NR_{99}$;

L is a direct bond, S, O, C1-C20alkylene or C2-C20alkylene interrupted by one or more nonconsecutive O;

$R_{99}$ is C1-C20alkyl or C1-C20hydroxyalkyl; or is C1-C20alkyl substituted by O(CO)$R_{102}$;

$M_1$ is S, CO or $NR_{100}$;

$M_2$ is a direct bond, $CH_2$, O or S;

$R_{100}$ and $R_{101}$ independently of one another are hydrogen, halogen, C1-C8alkyl, C1-C8alkoxy or phenyl;

$R_{102}$ is C1-C20alkyl;

$R_{103}$ is

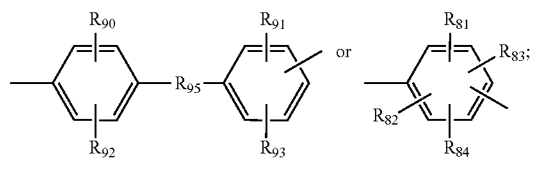

and

E is an anion, especially $PF_6$, $SbF_6$, $AsF_6$, $BF_4$, $(C_6F_5)B$, Cl, Br, $HSO_4$, $CF_3$—$SO_3$, F—$SO_3$,

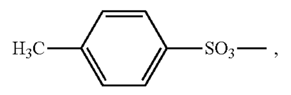

$CH_3$—$SO_3$, $ClO_4$, $PO_4$, $NO_3$, $SO_4$, $CH_3$—$SO_4$, or

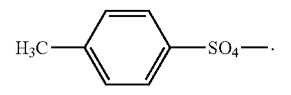

Specific examples of sulfonium salt compounds are for example Irgacure®270 (BASF SE); Cyracure® UVI-6990, Cyracure®UVI-6974 (Union Carbide), Degacure®KI 85 (Degussa), SP-55, SP-150, SP-170 (Asahi Denka), GE UVE 1014 (General Electric), SarCat®KI-85 (=triarylsulfonium hexafluorophosphate; Sartomer), SarCat® CD 1010 (=mixed triarylsulfonium hexafluoroantimonate; Sartomer); SarCat® CD 1011 (=mixed triarylsulfonium hexafluorophosphate; Sartomer), Suitable iodonium salt compounds are of formula XVI (XVI)

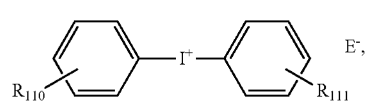

wherein $R_{110}$ and $R_{111}$ are each independently of the other hydrogen, C1-C20alkyl, C1-C20alkoxy, OH substituted C1-C20alkoxy, halogen, C2-C12alkenyl, C3-C8cycloalkyl, especially methyl, isopropyl or isobutyl; and E is an anion, especially $PF_6$, $SbF_6$, $AsF_6$, $BF_4$, $(C6F_5)$ B, Cl, Br, $HSO_4$, $CF_3$—$SO_3$, F—$SO_3$,

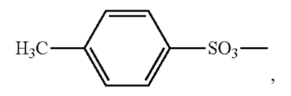

$CH_3$—$SO_3$, $ClO_4$, $PO_4$, $NO_3$, $SO_4$, $CH_3$—$SO_4$ or

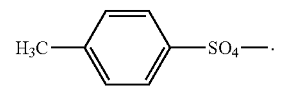

Specific examples of iodonium salt compounds are e.g. tolylcumyliodonium tetrakis(pentafluoro-phenyl) borate, 4-[(2-hydroxy-tetradecyloxy)phenyl]phenyliodonium hexafluoroantimonate or hexafluorophosphate, tolylcumyliodonium hexafluorophosphate, 4-isopropylphenyl-4'-methylphenyliodonium hexafluorophosphate, 4-isobutylphenyl-4'-methylphenyliodonium hexafluorophosphate (IrgacureR250, BASF SE), 4-octyloxyphenylphenyliodonium hexafluorophosphate or hexafluoroantimonate, bis(dodecylphenyl) iodonium hexafluoroantimonate or hexafluor-ophosphate, bis(4-methylphenyl) iodonium hexafluorophosphate, bis(4-methoxyphenyl) iodonium hexafluorophosphate, 4-methylphenyl-4'-ethoxyphenyliodonium hexafluorophosphate, 4-methylphenyl-4'-dodecylphenyliodonium hexafluorophosphate, 4-methylphenyl-4'-phenoxy-phenyliodonium hexafluorophosphate.

Of all the iodonium salts mentioned, compounds with other anions are, of course, also suitable. The preparation of iodonium salts is known to the person skilled in the art and described in the literature, for example U.S. Pat. Nos. 4,151,175, 3,862,333, 4,694,029, EP 562897, U.S. Pat. Nos. 4,399,071, 6,306,555, WO 98/46647 J. V. Crivello, "Photoinitiated Cationic Polymerization" in: UV Curing: Science and Technology, Editor S. P. Pappas, pages 24-77, Technology Marketing Corpora-tion, Norwalk, Conn. 1980, ISBN No. 0-686-23773-0; J. V. Crivello, J. H. W. Lam, Macromole-cules, 10, 1307 (1977) and J. V. Crivello, Ann. Rev. Mater. Sci. 1983, 13, pages 173-190 and J. V. Crivello, Journal of Polymer Science, Part A: Polymer Chemistry, Vol. 37, 4241-4254 (1999).

Preferably, the photoinitiator B is selected from alpha-hydroxy ketone compounds, alpha-alkoxyketone compounds, alpha-aminoketone compounds, benzophenone compounds, acylphosphine oxide compounds, and blends of two or more of the aforementioned compounds; preferably, the photoinitiator B is selected from an alpha-hydroxy ketone, alpha-alkoxyketone, or alpha-aminoketone compound of formula (XI), a benzophenone compound of formula (X); blends of two or more compounds of formula (XI) and/or (X); an acylphosphine oxide compound of formula (XII), and blends of one or more compounds of formula (XI) and/or (X) with one or more compounds of formula (XII)

(XI)

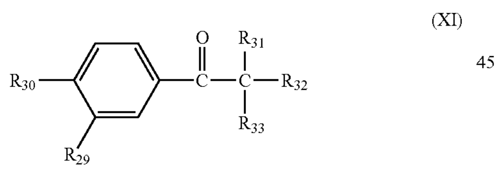

wherein $R_{29}$ is hydrogen or C1-C18alkoxy;

$R_{30}$ is hydrogen, $C_1$-$C_{18}$alkyl, $C_1$-$C_{12}$hydroxyalkyl, $C_1$-$C_{18}$alkoxy, $OCH2CH_2$—$OR_{34}$, morpholino, S—$C_1$-$C_{18}$alkyl, a group —HC═$CH_2$, —C($CH_3$)═$CH_2$,

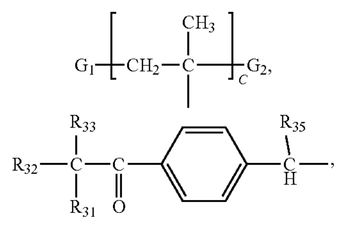

-continued

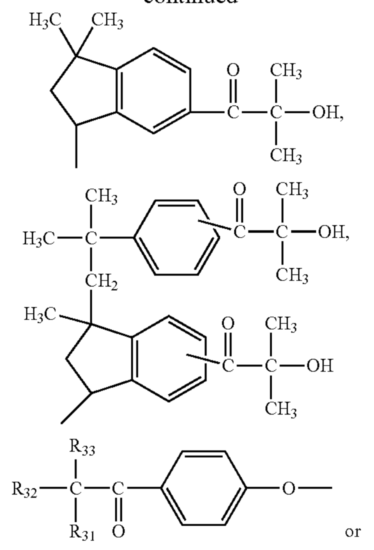

or

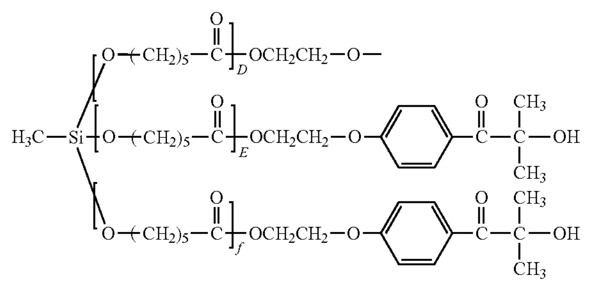

d, e and f are 1-3;

c is 2-10;

$G_1$ and $G_2$ independently of one another are end groups of the polymeric structure, preferably hydrogen or methyl;

$R_{34}$ is hydrogen,

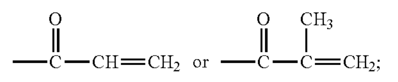

or $R_{31}$ is hydroxy, $C_1$-$C_{16}$alkoxy, morpholino, dimethylamino or —O($CH_2CH_2O$)$_g$—$C_1$-$C_{16}$alkyl;

g is 1-20;

$R_{32}$ and $R_{33}$ independently of one another are hydrogen, $C_1$-$C_6$alkyl, $C_1$-$C_{16}$alkoxy or —O($CH_2CH_2O$)$_g$—$C_1$-$C_{16}$alkyl; or are unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring;

$R_{35}$ is hydrogen, $OR_{36}$ or $NR_{37}R_{38}$, $R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more OH, or $R_{36}$ is

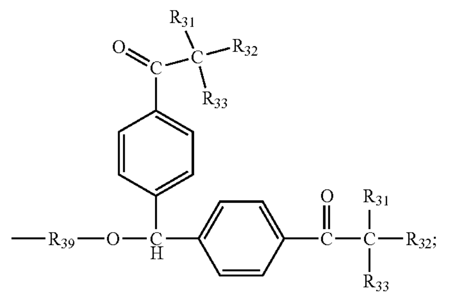

$R_{37}$ and $R_{38}$ independently of each other are hydrogen or $C_1$-$C_{12}$alkyl which is unsubstituted or is substituted by one or more OH;

$R_{39}$ is $C_1$-$C_{12}$alkylene which optionally is interrupted by one or more non-consecutive O, —(CO)—NH—$C_1$-$C_{12}$alkylene-NH—(CO)— or

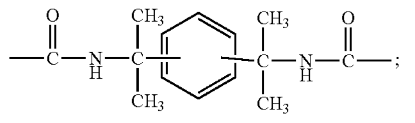

with the proviso that $R_{31}$, $R_{32}$ and $R_{33}$ not all together are $C_1$-$C_{16}$alkoxy or —$O(CH_2CH_2O)_g$—$C_1$-$C_{16}$alkyl;

(X)

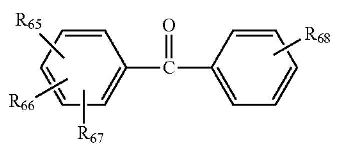

wherein $R_{65}$, $R_{66}$ and $R_{67}$ independently of one another are hydrogen, $C_1$-$C_4$alkyl, $C_1$-$C_4$-halogenalkyl, $C_1$-$C_4$alkoxy, Cl or $N(C_1$-$C_4$ alkyl$)_2$;

$R_{68}$ is hydrogen, $C_1$-$C_4$alkyl, $C_1$-$C_4$halogenalkyl, phenyl, $N(C_1$-$C_4$alkyl$)_2$, $COOCH_3$,

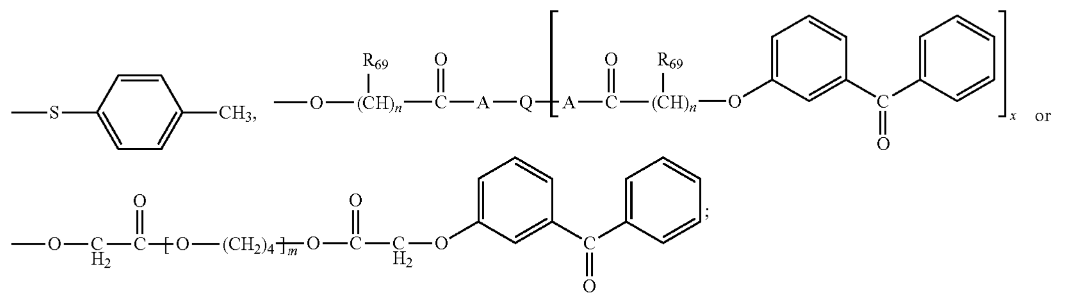

or

Q is a residue of a polyhydroxy compound having 2 to 6 hydroxy groups;

x is a number greater than 1 but not greater than the number of available hydroxyl groups in Q;

A is —$[O(CH_2)_bCO]_y$— or —$[O(CH_2)_bCO]_{(y-1)}$—$[O(CHR_{69}CHR_{69'})_a]_y$—;

$R_{69}$ and $R_{69'}$ independently of one another are hydrogen, methyl or ethyl; and if N is greater than 1 the radicals $R_{69}$ may be the same as or different from each other;

a is a number from 1 to 2;

b is a number from 4 to 5;

y is a number from 1 to 10;

n is a number from 1 to 10; and m is an number of 2 to 10;

(XII)

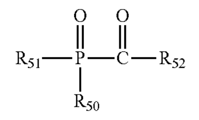

wherein $R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$;

or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;

$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or —(CO)—$R'_{52}$; or $R_{51}$ is $C_1$-$C_{12}$alkyl which is unsubstituted or substituted by one or more halogen, $C_1$-$C_{12}$alkoxy, $C_1$-$C_{12}$alkylthio or by $NR_{53}R_{54}$;

$R_{52}$ and $R'_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;

$R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl.

In certain cases it may be of advantage to use mixtures of two or more photoinitiators.

The photoinitiator is more preferably a blend of an alpha-hydroxy ketone, alpha-alkoxyketone or alpha-aminoketone compound of the formula (XI) and a benzophenone compound of the formula (X); or a blend of an alpha-hydroxy ketone, alpha-alkoxyketone or alpha-aminoketone compound of the formula (XI), a benzophenone compound of the formula (X) and an acylphosphine oxide compound of the formula (XII).

Halogen is fluorine, chlorine, bromine and iodine.

C1-C24alkyl (C1-C20alkyl, especially C1-C12alkyl) is typically linear or branched, where possible. Examples are methyl, ethyl, n-propyl, isopropyl, n-butyl, sec.-butyl, isobutyl, tert.-butyl, n-pentyl, 2-pentyl, 3-pentyl, 2,2-dimethylpropyl, 1,1,3,3-tetramethylpentyl, n-hexyl, 1-methylhexyl, 1,1,3,3,5,5-hexamethylhexyl, n-heptyl, isoheptyl, 1,1,3,3-tetramethylbutyl, 1-methylheptyl, 3-methylheptyl, n-octyl, 1,1,3,3-tetramethylbutyl and 2-ethylhexyl, n-nonyl, decyl, undecyl, dodecyl, tridecyl, tetradecyl, pentadecyl, hexadecyl, heptadecyl, or octadecyl. C1-C8alkyl is typically methyl, ethyl, n-propyl, isopropyl, n-butyl, sec.-butyl, isobutyl, tert.-butyl, n-pentyl, 2-pentyl, 3-pentyl, 2,2-dimethyl-propyl, n-hexyl, n-heptyl, n-octyl, 1,1,3,3-tetra methyl butyl and 2-ethylhexyl. C1-C4alkyl is typically methyl, ethyl, n-propyl, isopropyl, n-butyl, sec.-butyl, isobutyl, tert.-butyl.

C2-C12alkenyl (C2-C8alkenyl) groups are straight-chain or branched alkenyl groups, such as e.g. vinyl, allyl, methallyl, isopropenyl, 2-butenyl, 3-butenyl, isobutenyl, n-penta-2,4-dienyl, 3-methylbut-2-enyl, n-oct-2-enyl, or n-dodec-2-enyl.

C1-C12alkoxy groups (C1-C8alkoxy groups) are straight-chain or branched alkoxy groups, e.g. methoxy, ethoxy, n-propoxy, isopropoxy, n-butoxy, sec-butoxy, tert-butoxy, amyloxy, isoamyloxy or tert-amyloxy, heptyloxy, octyloxy, isooctyloxy, nonyloxy, decyloxy, undecyloxy and dodecyloxy.

C1-C12alkylthio groups (C1-C8alkylthio groups) are straight-chain or branched alkylthio groups and have the same preferences as the akoxy groups, except that oxygen is exchanged against sulfur.

C1-C12alkylene is bivalent C1-C12alkyl, i.e. alkyl having two (instead of one) free valencies, e.g. trimethylene or tetramethylene.

A cycloalkyl group is typically C3-C8cycloalkyl, such as, for example, cyclopentyl, cyclohexyl, cycloheptyl, or cyclooctyl, which may be unsubstituted or substituted.

In several cases it is advantageous to employ in addition to the photoinitiator a sensitizer compound. Examples of suitable sensitizer compounds are disclosed in WO 06/008251, page 36, line 30 to page 38, line 8, the disclosure of which is hereby incorporated by reference. As sensitizer inter alia benzophenone compounds as described above can be employed.

In one embodiment, the radiation curable composition does not comprise a sensitizer comprisesing amino groups.

Suitable photoinitiators especially useful for cationic curing are described in the following:

Especially useful for cationic curing are onium salts.

The onium salts are preferably selected from the group consisting of azonium salts, oxonium salts, iodonium salts, sulfonium salts and mixtures thereof, more preferably selected from the group consisting of oxonium salts, iodonium salts, sulfonium salts and mixtures thereof, and still more preferably selected from the group consisting iodonium salts, sulfonium salts and mixtures thereof.

The iodonium salts described herein have a cationic moiety and an anionic moiety, wherein the anionic moiety is preferably $BF_4^-$, $B(C_6F_5)_4^-$, $PF_6^-$, $AsF_6^-$, $SbF_6^-$, or $CF_3SO_3^-$ more preferably $SbF_6^-$ or $PF_6^-$ and wherein the cationic moiety is preferably an aromatic iodonium ion, more preferably an iodonium ion comprising two aryl groups, wherein the two aryl groups may be independently substituted by one or more alkyl groups (such as for example methyl, ethyl, isobutyl, tertbutyl, etc.) one or more alkoxy groups, one or more nitro groups, one or more halogen containing groups, one or more hydroxy groups or a combination thereof. Particularly suitable examples of iodonium salts are commercially available under the name Omnicat 250 and 440 from IGM Resins and Speedcure 938 from Lambson.

The one or more sulfonium salts described herein have a cationic moiety and an anionic moiety, wherein the anionic moiety is preferably $BF_4^-$, $B(C_6F_5)_4^-$, $PF_6^-$, $(PF_{6-m}(C_nF_{2n-1})_m)^-$ (where m is an integer from 1 to 5, and n is an integer from 1 to 4, $AsF_6^-$, $SbF_6^-$, or $CF_3SO_3^-$, perfluoroalkyl sul-fonate or pentafluorohydroxyantimonate, more preferably $SbF_6^-$ or $PF_6^-$ and wherein the cationic moiety is preferably an aromatic sulfonium ion, more preferably a sulfonium ion comprising two or more aryl groups, wherein the two or more aryl groups may be independently substituted by one or more alkyl groups (such as for example methyl, ethyl, isobutyl, tertbutyl, etc.) one or more alkoxy groups, one or more aryloxyl groups, one or more halogen containing groups, one or more hydroxy groups or a combination thereof.

Suitable examples of sulfonium ions comprising two or more aryl groups include triarylsulfonium ions, diphenyl[4-(phenylthio)phenyl]sulfonium ion, bis[4-(diphenylsulfonio)phenyl]sulfonium ion, triphenylsulfonium ions and tris[4-(4-acetylphenyl) sulfanyiphenyl]sulfonium ion.

Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

For embodiments wherein the radiation curable composition comprises radically curable monomers and cationically curable momomers, either a mixture of photoinitiators is employed, wherein at least one photoinitiator useful for radically curing mentioned above and at least one photoinitiator useful for cationically curing mentioned above is employed or at least one photoinitiator useful for both, radically and cationically curing, e.g. onium salts, like sulfonium salts and iodonium salts. Specific examples for onium salts, especially sulfonium salts and iodonium salts are mentioned above.

Component B is generally present in the radiation curable composition according to the present invention in an amount of 1 to 10 wt %, preferably 5 to 10 wt. %, more preferably 5 to 8 wt %, based on the total amount (100 wt %) of the inventive composition.

Component C

The inventive radiation curable composition comprises one or more rheology modifying agents as component C.

Rheology modifying agents are substances which, when added to a system, change the system's rheological properties such as flow, viscosity, leveling, sag resistance, settling and the like.

The rheology modifying agent is an associative or a non-associative rheology modifying agent. Preferably, the rheology modifying agent is a non associative rheology modifying agent.

An associative rheology modifying agent is a rheology modifying agent which interacts with the medium it is modifying rheologically and a non-associative rheology modifying agent is a rheology modifying agent which has a rheology modifying effect without an interaction with the medium it is modifying rheologically.

Rheology modifying agents suitable in the inventive radiation curable compositions are for example clays, organoclays, silicas like precipitated silica and fumed silica, organic and polymeric thickeners. Such Rheology modifying agents are generally known in the art and commercially available.

Clay minerals are a group of minerals essentially composed of hydrated aluminum silicates. Among these are montmorillonite, kaolin, illite, saponite, bentonite, hectorite, beidellite, steven-site, attapulgite and sepiolite. One important type of clay mineral is hectorite, which is obtained from various deposits. Hectorite deposits typically contain about 50% hectorite by weight, the other components being mainly calcite and dolomite and sometimes feldspar. The hectorite deposit is usually beneficiated by removing the impurities, for example, by preparing a water slurry, centrifugation, separation of the purified clay and drying the clay by various drying methods such as drum drying, oven drying or spray drying.

Among the polymeric rheological additives are guar gum, tragacanth gum, pectin, xanthan and alginate, which are natural thickeners, cellulosics like hydroxyethylcellulose, cellulosic ethers, hydrophobically modified cellulosic materials and methyl cellulose, which are modified cellulosics and synthetic polymers or copolymers of ethylenically unsaturated carboxylic acids and their ester derivatives, such as poly(acrylic acid), poly acrylamide and maleic anhydride-styrene copolymers, like a copolymer which is the reaction product of methacrylic acid, methyl methacrylate and vinyl acetate. Another type of synthetic thickeners is based on hydrophobically cap-ping a water soluble polymer. For example, a thickener based on a water soluble polyether capped with insoluble hydrocarbon residues and polyurethane-based copolymers which have hydrophobic end groups connected by hydrophilic polyether groups.

Further suitable rheology modifying agents are for example mixtures of at least one clay, polymeric material and starch, urea urethanes, rheology modifying agents based on polyhydroxycar-boxamides, reaction products of an alkyd resin and a poly(ester)amide, high molecular weight polyethyleneimines with a preferred molecular weight of about 750 000 g/mol, products obtained by reacting at least one polymerized fatty acid or at least one reaction product of at least two polymerized fatty acids and at least one polyamine having at least two primary amino groups with at least one polyalkylene polyamine.

Preferably, the rheology modifying agent is an inorganic rheology modifying agent C1, e.g. silicas, like precipitated silicas or fumed silicas or phyllosilicates, preferably hydrophilic or hydrophobic fumed silica, more preferably hydrophilic fumed silica, preferably with a BET specific surface area from 50 to 500 $m^2/g$ and more preferably from 150 to 250 $m^2/g$, or an organic rheology modifying agent C2, e.g. rheology modifying agents based on urea, cellulose ethers or cellulose esters, preferably based on urea, more preferably polyurea, most preferably polyurea having a weight average molecular weight Mw from 5,000 to 70,000 g/mol. It is further possible to employ mixtures of rheology modifying agents.

Most preferred rheology modifying agents are based on urea, more preferably polyurea, most preferably polyurea having a weight average molecular weight Mw from 5,000 to 70,000 g/mol.

Such rheology agents are for example described in U.S. Pat. No. 9,617,371 B2.

Most preferably, the rheology modifying agent is hydrophilic fumed silica, preferably with a BET specific surface area from 50 to 500 $m^2/g$ and more preferably from 150 to 250 $m^2/g$.

Component C is generally present in the radiation curable composition according to the present invention in an amount of 0.5 to 3.5 wt %, preferably 2 to 3.5 wt. %, more preferably 2.2 to 3 wt %, based on the total amount (100 wt %) of the inventive composition.

In a further embodiment, the present invention relates to a radiation curable, preferably UV curable, screen printing composition for cast-curing comprising a) one or more compounds comprising radiation curable, preferably UV curable, groups, preferably selected from compounds comprising free radically curable groups, e.g. photo-crosslinkable (meth)acrylate or aromatic vinyl groups, compounds comprising cationically curable groups, e.g. cycloaliphatic epoxides, and combinations of compounds comprising free radically curable groups and cationically curable groups as component A,
b) one or more photoinitiators as component B,
c) one rheology modifying agent as component C,
d) optionally one or more defoaming agents as component D,
e) optionally one or more adhesion promoters as component E,
f) optionally one or more functional material, as component F, wherein component C is based a hydrophilic fumed silica, preferably with a BET specific surface area from 50 to 500 $m^2/g$ and more preferably from 150 to 250 $m^2/g$.

Components A, B and C have been described above and components D, E and F are described below.

Preferably, the radiation curable, preferably UV curable, composition mentioned above has a composition has a shear rate dependent viscosity, preferably a shear rate and time dependent viscosity, wherein the viscosity at 35° C. is 15 to 40 Pa S, preferably 15 to 35 Pa S at a shear rate of 0.1 $s^{-1}$ and the viscosity at 35° C. is <0.15 Pa S at a shear rate of 1000 $s^{-1}$, determined according to ISO 3219-2:2021, by a TA Instruments AR-2000 Rheometer using a truncated cone of 60 mm 2° stainless steel and plate geometry, and measurements are conducted in the rotational mode using shear rate control.

Component D

The inventive radiation curable composition optionally comprises one or more defoaming agents as component D.

A defoaming agent (or an anti foaming agent) is a chemical additive that reduces and/or hinders the formation of foam in the inventive radiation curable compositions. The terms defoaming agent (or defoamer) and anti foaming agent are used interchangeably in the meaning of the present invention. Strictly speaking, defoaming agents (or defoamers) eliminate existing foam and anti foaming agents prevent the formation of further foam. Commonly used defoaming agents are known in the art.

Preferably, the defoaming agent D employed in the radiation curable compositions according to the present invention is a silicon free defoaming agent. Suitable defoaming agents are for example certain alcohols, certain esters and/or ethers, insoluble oils, stearates and glycols.

More preferably, the defoaming agent D is based on a graft copolymer of polyalkyl vinyl ether or block copolymers of ethylene oxide and 1,2-propylene oxide which are etherified with a polyhydric alcohol and additionally esterified with a carboxylic acid.

Component D is generally present in the radiation curable composition according to the present invention in an amount of 0.5 to 2 wt %, preferably 0.75 to 1.5 wt. %, more preferably 0.8 to 1.1 wt %, based on the total amount (100 wt %) of the inventive composition.

Component E

The inventive radiation curable composition optionally comprises one or more adhesion promoters as component E.

The adhesion promoter generally facilitates the bonding between the substrate and the inventive radiation curable composition. Suitable adhesion promoters are generally known in the art.

Preferably, the adhesion promoter E is at least one radiation-curable compound having at least one, specifically one to three, more specifically one to two, and very specifically one free acid group or a copolymerizable amine.

The free acid groups may be, for example, carboxyl, sulfate, sulfite, phosphate, or phosphite groups or, in the case of sulfate, sulfite, phosphate, or phosphite groups, their partial esters.

Preferably, component E has at least one radiation-curable group, specifically one to two radia-tion-curable groups, more specifically (meth)acrylate groups.

More preferably, component E has a molecular weight of not more than 1000 g/mol, more specifically not more than 800 g/mol, very specifically not more than 500 g/mol, more particularly of not more than 400, and especially of not more than 350 g/mol.

Examples of component E are acrylic acid, methacrylic acid, ethacrylic acid, α-chloroacrylic acid, crotonic acid, maleic acid, vinylsulfonic acid, vinylphosphonic acid, maleic acid, fumaric acid, itaconic acid, citraconic acid, mesaconic acid, glutaconic acid, aconitic acid, cinnamic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropyl-sulfonic acid, allylphosphonic acid, styrenesulfonic acid, 2-acrylamido-2-methylpropanesulfonic acid, and 2-acrylamido-2-methylpropanephosphonic acid.

Most preferably, component E comprises methacrylate and/or acrylate modified acidic compounds or compounds of the formulae (Va) and (Vb), and also mixtures thereof

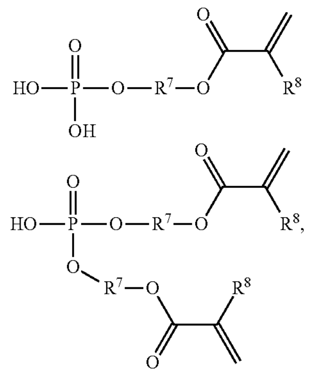

wherein $R_7$ is $C_2$-$C_6$alkylene and $R_8$ is hydrogen or methyl.

$C_2$-$C_6$alkylene denotes for example 1,2-ethylene, 1,2-propylene, 1,3-propylene, 1,2-butylene, 1,3-butylene, 1,4-butylene, 1,5-pentylene, or 1,6-hexylene, specifically 1,2-ethylene, 1,2-propylene, 1,3-propylene, or 1,4-butylene, more specifically 1,2-ethylene or 1,2-propylene, and very specifically 1,2-ethylene.

$R_8$ is specifically methyl.

Suitable components E are for example described in US 2015/0218408 A1.

Component E is generally optionally present in the radiation curable composition according to the present invention in an amount of 0 to 2 wt %, preferably 0.3 to 1.5 wt. %, more preferably 0.3 to 0.6 wt %, based on the total amount (100 wt %) of the inventive composition.

Component F

The inventive radiation curable composition optionally comprises one or more functional material, as component F.

Examples for suitable functional materials are described below.

The functional material generally provides an optical and/or a machine-readable characteristic to the curable composition. Typically, the functional material may take the form of particles, pigments, flakes or a dye which are incorporated into the composition. In the case where optical structures are being replicated the size of the particles or pigments of the functional material should preferably be sufficiently small and/or their concentration should be sufficiently low to avoid introducing optical scatter.

The optical characteristic may be any of: a visible colour, fluorescence, luminescence and phosphorescence.

"machine-readable" means in the sense of the present application that the substance is detectable by a machine which is typically capable of generating a quantitative output dependent on the amount of machine readable substance present (including simply detecting the presence or ab-sence of the substance). The machine-readable substance may be a material that absorbs and/or emits radiation within a specific wavelength band (e.g. infra-red radiation). Examples of suitable machine-readable substances (e.g. that react to an external stimulus) include any luminescent, fluorescent or phosphorescent material, or a material which exhibits Raman scattering. Magnetic materials may be used as the machine-readable substance. Typically, the external stimulus required and/or the emission of the machine-readable substance is outside the visible range of the electromagnetic spectrum (typically in the infra-red, IR, or ultra-violet, UV, ranges), such that de-tection of the machine readable substance does not occur under standard visible light conditions.

Examples of suitable functional materials include any luminescent, fluorescent or phosphorescent material, or a material which exhibits Raman scattering, for example. Magnetic materials may be used as a machine-readable substance. Exemplary phosphors can be any compound that is capable of emitting IR-radiation upon excitation with light. Suitable examples of phosphors include, but are not limited to, phosphors that comprises one or more ions capable of emitting IR radiation at one or more wavelengths, such as transition metal-ions including Ti-, Fe-, Ni-, Co- and Cr-ions and lanthanide-ions including Dy-, Nd-, Er-, Pr-, Tm-, Ho-, Yb- and Sm-ions. The exciting light can be directly absorbed by an IR-emitting ion. Acceptable phosphors also include those that use energy transfer to transfer absorbed energy of the exciting light to the one or more IR-emitting ions such as phosphors comprising sensitizers for absorption (e.g. transition metal-ions and lanthanide-ions), or that use host lattice absorption or charge transfer absorption. Acceptable infrared emitting phosphors include Er-doped yttrium aluminum garnet, Nd-doped yttrium aluminum garnet, or Cr-doped yttrium aluminum garnet.

Another type of machine-readable material that can be used is a direct bandgap semiconductor, for example a group II-VI (e.g. ZnO, ZnS, ZnSe, CdS, CdTe, CdSe etc.) or a group II-V (eg GaN, GaAs, AlN, InN etc) semiconductor can show strong luminescence. Another alternative is nano-structured materials (e.g. such as metallic, semiconductor and dielectric materials and combinations thereof), which can show many different types of luminescence such as fluorescence, phosphorescence, elastic and inelastic scattering.

A particularly preferred substance is Er—Yb—KGd $(PO_3)_4$ (also known as Er—Yb—KGP). Er—Yb—KGP strongly absorbs in the infra-red portion of the electromagnetic spectrum between about 960 nm and 990 nm. This substance can thus be regarded as having a waveband for absorption with a width of about 30 nm, and the predetermined input radiation for a security print medium incorporating it can be defined as radiation that falls within this waveband. After being excited by the predetermined input radiation, Er—Yb—KGP emits radiation across a range of wavelengths. The emission is also in the infra-red portion of the electromagnetic spectrum and is strongest between about 1520 nm and 1560 nm. The predetermined output radiation to be detected when authen-ticating or inspecting a security device incorporating this substance can be regarded as that falling within the output waveband which has a width of about 40 nm. The wavebands of the input and output radiation of Er—Yb—KGP are thus relatively narrow. This is advantageous.

In addition the functional materials may exhibit an optically variable effect which can be generated by interference pigments (including magnetically orientated interference pigments), pearlescent pigments, pigments generated from photonic crystals or plasmonic structures.

Optically variable interference pigments have a colour shift between two distinct colours; with the colour shift being dependent on the viewing angle. The production of these pigments, their use and their characteristic features are described in U.S. Pat. Nos. 4,434,010, 5,059,245, 5,084,351, 5,135,812, 5,171,363, 5,571,624, EP-A-0341002, EP-A-0736073, EP-A-668329, EP-A-0741170 and EP-A-1114102. Optically variable interference pigments having a viewing angle dependent shift of colour are based on a stack of superposed thin-film layers with different optical characteristics. The hue, the amount of colour-shifting and the chromaticity of such thin-film structures depend inter alia on the material constituting the layers, the sequence and the number of layers, the layer thickness, as well as on the production process.

Component F is generally optionally present in the radiation curable composition according to the present invention in an amount of 0 to 50 wt %, preferably 0 to 30 wt. %, more preferably 0 to 15 wt %, based on the total amount (100 wt %) of the inventive composition.

The inventive radiation curable composition preferably comprises ai) 1 to 58.5% by weight, preferably 15 to 40 wt. %, more preferably 20 to 36 wt %, of component A1, and aii) 40 to 95% by weight, preferably 45 to 80 wt. %, more preferably 50 to 70 wt %, of component A2, b) 1 to 10% by weight, preferably 5 to 10% by weight, more preferably 5 to 8 wt %, of component B, c) 0.5 to 3.5% by weight, preferably 2 to 3.5 wt. %, more preferably 2.2 to 3 wt %, of component C, d) 0 to 2% by weight, preferably 0.75 to 1.5 wt. %, more preferably 0.8 to 1.1 wt %, of component D, e) 0 to 2% by weight, preferably 0.3 to 1.5 wt. %, more preferably 0.3 to 0.6 wt %, of component E, and f) 0 to 50% by weight, preferably 0 to 30 wt. %, more preferably 0 to 15 wt %, of component F, wherein the sum total of components A1, A2, B, C, optionally D, optionally E and optionally F is 100 weight %.

In one preferred embodiment the radiation curable composition according to the present invention is transparent in cured form.

"transparent" is used to mean that the material is substantially visually clear, such that an item on one side of the material can be seen through the material from the other side. Therefore transparent materials should have low optical scatter. However, transparent materials may nonetheless be optically detectable, e.g. carrying a coloured tint.

Preferably, "transparent" is defined in the present application as follows: The transparent material (e.g. the cured composition (based on the inventive radiation curable composition) or an optionally present primer) in form of a layer (e.g. of the cured composition or of an optionally present primer) which is 20 microns thick has a haze of 50% or less, preferably 30% or less, more preferably 20% or less, most preferably 10% or less, as measured according to ASTM D1003-21 (Procedure A-Hazemeter) and/or has an optical density of 0.3 or less, preferably 0.15 or less, more preferably 0.05 or less.

The present invention further relates to an article comprising a substrate and a coating comprisesing a radiation cured composition according to the present invention, wherein the coating is in form of a surface relief structure.

The present invention further relates to a security article comprising the at least one article.

The security article may be used to form a security document preferably comprising a banknote, a passport, an identification document, a driver's licence, a bank card, a cheque, a certificate, a stamp or a visa. Further security documents are mentioned below. The surface relief structure can be formed directly on the security document, or on a separate substrate which is later applied to or incorporated into such a document.

The security article may take the form of a security thread, strip, insert, foil or patch which is later applied to or incorporated into a secure document.

Surface relief structures are defined above.

The substrate material can be any suitable substrate material that can be used as printable material. In addition the radiation curable composition is preferably able to be at least partially cured through the substrate whilst it is in contact with the relief structure of the casting tool. In general, the substrate may comprise paper, polymer (e.g. biaxially oriented polypropylene, BOPP, or polycarbonate), cellulose or a combination thereof.

Preferably the substrate is a polymeric substrate, optionally provided with one or more opacifying layers.

The substrate forms the structural basis of the security article and is typically provided in sheet or web from.

The thickness of the substrate is preferably in the range 15 to 1000 microns, preferably 30-500 microns and most preferably about 50-200 microns.

Sheet-fed printing is when an individual sheet of substrate is fed into a machine. The substrate is cut in sheets before printing. Web offset printing is when a roll of substrate is fed through the printing press and then it is cut to size afterwards.

In one embodiment, the substrate is a polymer or plastics substrate. Suitable polymer substrates useful for the preparation of security documents are known in the art. The polymer substrate is preferably transparent although this is not essential in all cases. The polymer substrate comprises one or more polymeric materials, typically thermoplastics, such as: polypropylene (PP) (most preferably bi-axially oriented PP (BOPP)), polyesters such as poly(ethylene tereph-thalate) (PET), poly(1,4-butylene terephthalate) (PBT), poly(ethylene 2,6-naphthoate) (PEN), polyethylene (PE), polycarbonate (PC), polyvinyl chloride (PVC), polyamides such as nylon, acrylic polymers, Cyclic Olefin Polymer (COP) or Cyclic Olefin Copolymer (COC), or any combi-nation thereof.

The substrate may be monolithic, e.g. formed from a single one of the above materials, or multi-layered, e.g. having multiple layers of the same type of polymer (optionally with different orientations) or layers of different polymer types. In preferred examples, the document substrate comprises a core polymer substrate with at least one opacifying layer disposed on one or both sur-faces of the core polymer substrate, optional gaps in one or more of the opacifiying layers forming window or half-window regions of the document substrate. For example the security document could be a polymer banknote. The opacifying layers are preferably of non-fibrous materials such as a coating of binder containing light-scatting pigments, preferably white, off-white or grey in colour (such as $TiO_2$). WO-A-8300659 describes a polymer banknote formed from a transparent substrate comprising an opacifying coating on both sides of the substrate. The opacifying coating is omitted in localised regions on both sides of the substrate to form a trans-parent region.

In a further embodiment, the substrate is a paper or other fibrous material substrate. Suitable paper or other fibrous material substrates useful for the preparation of security documents are known in the art. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical paper or other fibrous material substrates are cotton paper and cellulose paper. Paper substrates may also comprise transparent window regions. WO-A-0039391 describes a method of making a transparent region in a paper substrate. Other methods for forming transparent regions in paper substrates are de-scribed in EP-A-723501, EP-A-724519, WO-A-03054297 and EP-A-1398174.

In a further embodiment, the substrate is a composite material, e.g a combination of a polymer substrate and a paper substrate. Suitable composite materials useful for the preparation of se-curity documents are known in the art. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Examples are paper substrates covered with one or more polymer layers, e.g. substrates based on a cotton substrate which is covered with one or more polymer layers on one or both sides of the cotton substrate, protecting the substrate. The layers can be of any thickness and are for example ultra-thin.

Typical examples of metalized plastics or polymers include the plastic or polymer materials de-scribed hereabove having a metal disposed continuously or discontinuously on their surface. Typical examples of metals include without limitation aluminum, chromium, copper, gold, silver, alloys thereof and combinations of two or more of the aforementioned metals. The metallization of the plastic or polymer materials may be done by an electrodeposition process, a high-vacuum coating process or by a sputtering process.

The substrate can comprise further additives that are known to the skilled person, such as fill-ers, sizing agents, whiteners, processing aids, reinforcing or wet strengthening agents, etc.

One or both surfaces of the substrate may be treated to improve adhesion/retention of subsequently applied materials. For example a thermoplastic layer may be applied in a heat sealing process. Alternatively, a primer layer may be applied to all or part of either surface of the substrate, e.g. by printing or coating. The primer layer is preferably also transparent and again could be tinted or carry another optically detectable material. Suitable primer layers include compositions comprising water-based types or solvent based types.

Water Based Types are for Example:

- Polyurethane typically with polyester, polycarbonate or polyether polyols—examples such as Covestro NeoRez® R-610
- Polyacrylics like crosslinked or uncross-lined hydroxylated acrylates or UV curing anionic or cationic acrylates—most specifically Ethylene acrylic acid copolymer (EAA) and Ethylene vinyl acetate copolymer (EVA).—Examples such as Covestro NeoCryl® A1127
- Polyethyleneimine (PEI)—examples such as Dow ADCOTE® 313E
- Chlorinated Polyolefin—examples such as Eastman® CP 310W
- Polyolefin—examples such as Tramaco Trapylen® 9350W Solvent Based Types are for Example

- Polyurethane typically with polyester, polycarbonate or polyether polyols—examples such as Covestro NeoRez® 326
- Nitrocellulose
- Chlorinated polyolefin resin—Examples such as Tramaco Trapylen® T8280.
- Polyolefin resin—Examples such as Tramaco Trapylen® X 9100 M
- Polyester resin—Examples such as Dow ADCOTE® 69-100

Alternatively or in addition to the application of a primer layer, the surface of the substrate may be prepared for onward processing by controlling its surface energy. Suitable techniques for this purpose include plasma or corona treatment.

The application of the primer layer(s) and/or other surface treatment steps may be carried out as part of the processing steps described below, e.g. before the application of the inventive radiation curable composition to the substrate, potentially in line with those processes. Alternatively, the application of the primer layer(s) and/or other surface treatment steps could be carried out separately such that the pre-treated substrate is supplied to the security document manufacturing process ready for the application of the inventive radiation curable composition thereto.

According to the present invention, the term "article" means any item comprising at least substrate and at least coating comprising a radiation cured composition based on the radiation curable composition according to the present invention, wherein the coating is in form of a surface relief structure. Suitable substrates, the radiation curable compositions according to the present invention and relief structures are described above. Said article is preferably a part of a security article described below.

The inventive article comprising a surface relief structure, is prepared by a method comprising the steps:

i) Providing a casting tool having a relief structure defined in a surface thereof, the relief structure corresponding to the surface relief structure;

ii) Applying to the substrate and/or the relief structure of the casting tool the radiation curable composition according to the present invention;

iii) Casting the radiation curable composition according to the present invention by bringing the substrate into contact with a casting tool comprising a relief structure and forming the surface relief structure in the coating composition; and iv) Radiation curing the coating composition such that the surface relief structure formed of the radiation curable composition is retained on the substrate.

A further subject matter of the present invention is therefore an article obtained by the above-mentioned method. Suitable substrates are described above.

In step iv), the coating composition may be fully or partially cured, i.e. in the fully cured composition all or nearly all curable sites, preferably 90 to 100%, more preferably 95 to 100%, more preferably 99 to 100% of the curable sites in the coating composition are cured. In the partially cured composition, not all curable sites are cured, preferably less than 90%, more preferably 50% to 90%, most preferably 70% to 90% of the curable sites are cured.

The radiation curing in step iv) takes place while the coating composition is in contact with the casting tool.

Preferably, the surface relief structure is present in form of a nanostructure or microstructure.

Preferably, the method further comprises the following step after the coating composition is partially or fully cured in step iv), preferably after the coating composition is fully cured in step iv):

v) Separation of the substrate and the casting tool.

In case that the coating composition is partially cured in step iv), another curing step (vi) is un-dertaken (i.e. a post curing step) to fully cure any non cured/partially cured materials.

The method therefore further comprises the following step after the separation of the substrate and the casting tool in step v), in the case that the coating composition is partially cured in step iv):

vi) Radiation curing the coating composition such that the surface relief structure formed of the radiation curable composition retained on the substrate is fully cured.

More preferably, the method comprises the following steps:

i) The casting tool in step i) is provided with a die form, the die form having a surface comprising an arrangement of raised areas and recessed areas defining the raised elements of the surface relief structure;

ii) In step ii) the radiation curable composition is applied to the surface of the die form such that the radiation curable composition substantially fills the recessed areas;

iii) Bringing in step iii) the substrate into contact with the surface of the die form such that it covers the recessed areas;

iv) Fully or partially curing the coating composition in step iv) such that the radiation curable composition in the recessed areas is removed from said recessed areas and retained on the substrate; and v) Separating the substrate from the surface of the die form.

In the case that the coating composition is partially cured in step iv), the following step is preferably additionally carried out:

vi) Radiation curing the coating composition such that the radiation curable composition in the recessed areas removed from said recessed areas and retained on the substrate is fully cured.

The substrate is typically provided initially in the form of sheets or a web. Preferably, the substrate is present in form of sheets in the method according to the present invention.

In a preferred embodiment of the method according to the present invention, the radiation curable composition is printed on the substrate by screen printing, preferably by rotary-screen printing.

In the method according to the present invention, the surface relief structure is a surface structure defining a plurality of peaks and troughs of any type, form and topology. For example, the surface relief structure can be one of; a diffractive structure; one or more micro-optic elements such as focussing elements, magnifying elements, faceted elements, reflective elements, or caustic elements; or a macro-structure, for example a tactile structure that enables the structure to be detected by touch. Preferably, the surface relief structure is present in form of a nanostructure or microstructure.

The present invention further relates to a security article comprising at least one inventive article described above.

Security article include without limitation security threads, strips, inserts, foils or patches. The security article may be used to form a security document.

Security documents include without limitation value documents and value commercial goods. Typical example of value documents include without limitation banknotes, identification documents, identification cards, bank cards, driving licenses, visas, cheques, certificates, deeds, tickets, like entrance tickets and public transportation tickets, vouchers, fiscal stamps and tax labels, agreements and the like, identity documents such as passports, especially passport datapages, credit cards, transactions cards, access documents or cards, academic diploma or titles and the like.

The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without *limi*-tation labels, such as authentication brand labels, tamper evidence labels and seals.

The present invention further relates to the use of the radiation curable composition according to the present invention for the preparation of a surface relief structure on a substrate, the use of the radiation curable composition according to according to the present invention for the preparation of a security device for use on a security article and the use of the radiation curable composition according to the present invention for screen printing, preferably rotary screen printing.

The present invention further relates to a printing press comprising the radiation curable composition according to the present invention, wherein the printing press is adapted to carry out printing on a web-like or sheet-like substrate, in particular for the production of security documents, comprising a printing unit, preferably a screen-printing unit, the printing press further comprises an in-line casting device comprising a casting tool and a radiation source, wherein the printing unit is designed to apply the radiation curable composition to the substrate and/or the casting tool and the inline-casting device is adapted to replicate and form a surface relief structure in the radiation curable composition.

The printing press is preferably adapted to carry out the method according to the present invention.

In the following, preferred examples of press configurations are described.

Figure 2:
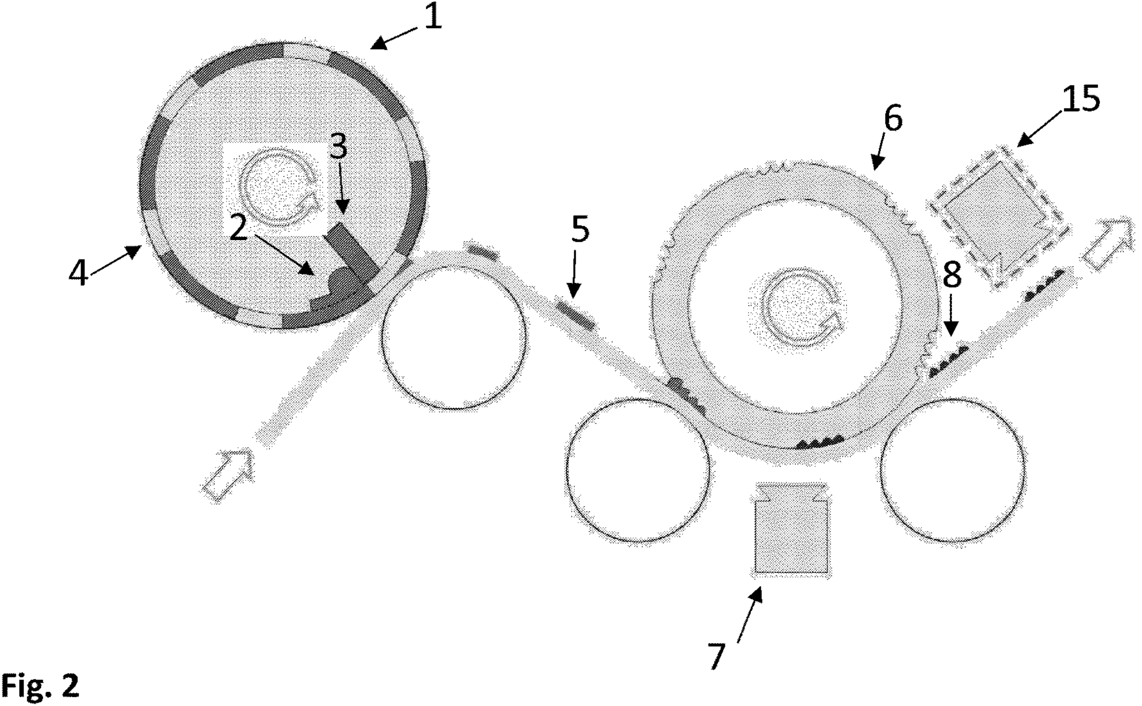
FIG. 2 illustrates a screen printing unit applying the radiation curable composition to a web as FIG. 1.
Figure 3:
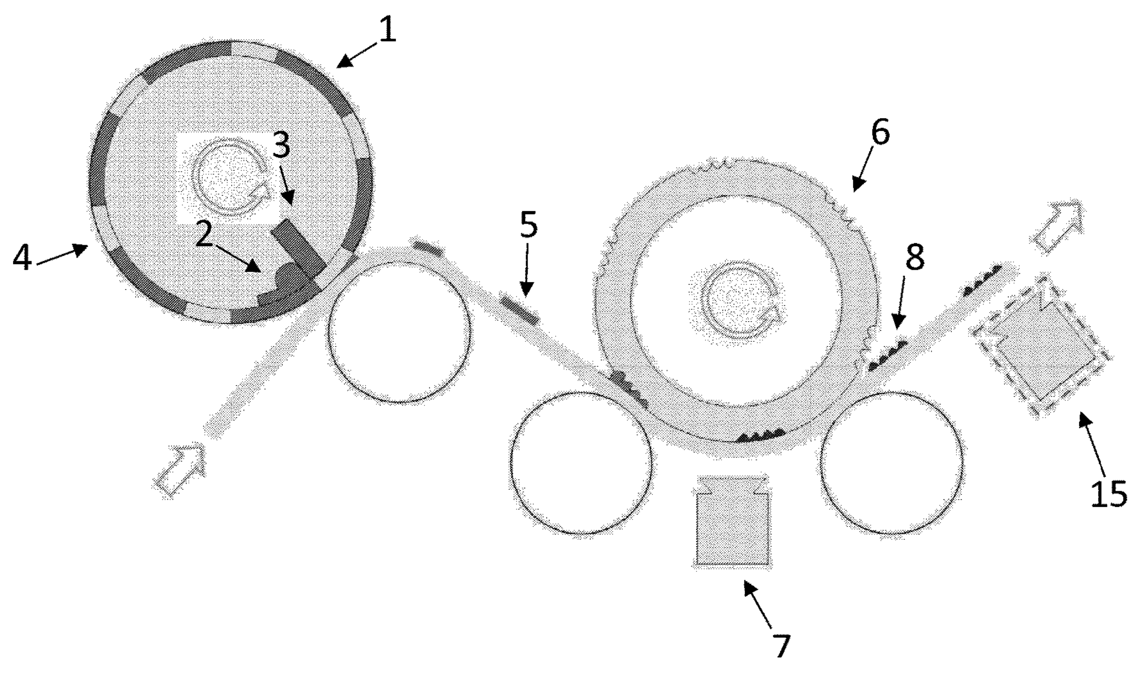
FIG. 3 illustrates a screen printing unit applying the radiation curable composition to a web as FIG. 1.
Figure 4:
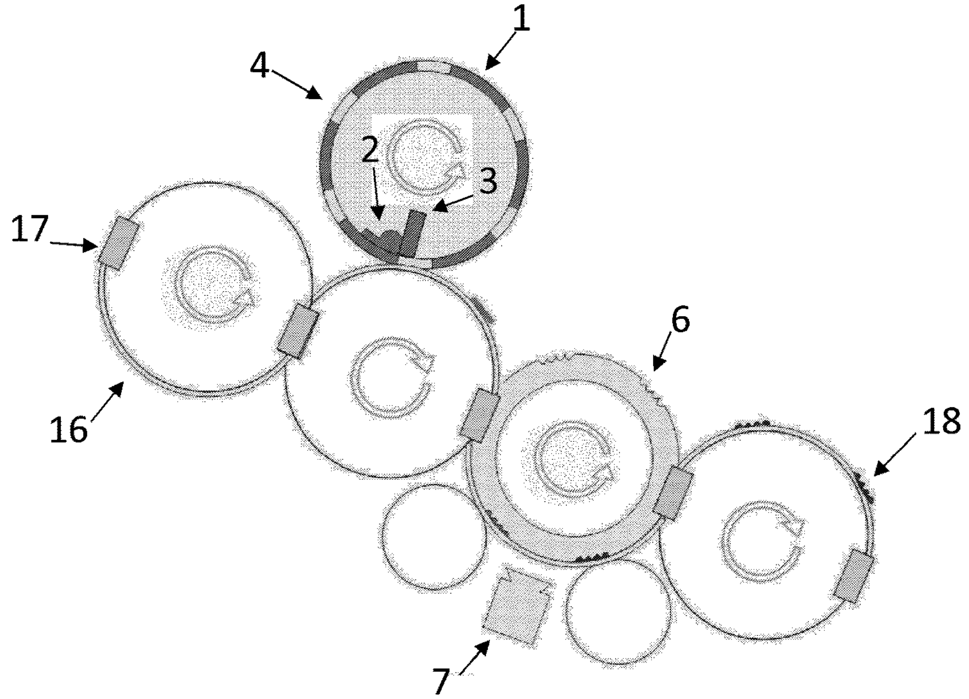
FIG. 4 illustrates a sheet fed system using the screen and casting unit as explained in the explanation of FIG. 1.

FIGS. 1 to 3 and 5 to 9 show a web based process for ease of illustration, but the invention is equally applicable to a sheet fed process as illustrated in FIG. 4.

FIG. 1 illustrates a screen printing unit applying the radiation curable composition to a web. The web is then transferred to an in-line casting device (casting tool) and the radiation curable composition flows into the recesses on the casting tool. The composition is then at least partly cured whilst the substrate is in contact with the casting tool. The cured composition in the form of a surface relief structure on the web is then released from the casting tool and transported to any subsequent processing step.

The numbers in FIG. 1 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |

FIG. 2 illustrates a screen printing unit applying the radiation curable composition to a web as FIG. 1. The web is then transferred to an in-line casting device (casting tool) and the radiation curable composition flows into the recesses on the casting tool. The composition is then partly cured whilst the substrate is in contact with the casting tool. The cured composition in the form of a surface relief structure on the web is then released from the casting tool and post-cured on the resin side of the substrate and then transported to any subsequent processing step.

The numbers in FIG. 2 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |
| 15 | Post-cure UV Lamp |

FIG. 3 illustrates a screen printing unit applying the radiation curable composition to a web as FIG. 1. The web is then transferred to an in-line casting device (casting tool) and the radiation curable composition flows into the recesses on the casting tool. The composition is then partly cured whilst the substrate is in contact with the casting tool. The cured composition in the form of a surface relief structure on the web is then released from the casting tool and post-cured on the non-resin side of the substrate and then transported to any subsequent processing step.

The numbers in FIG. 3 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |
| 15 | Post-cure UV Lamp |

FIG. 4 illustrates a sheet fed system using the screen and casting unit as explained in the expla-nation of FIG. 1.

The numbers in FIG. 4 have the following meanings:

| | |
|---|---|
| 1 | Screen |
| 2 | Radiation curable composition |
| 3 | Squeegee |
| 4 | Exposed Mesh |
| 6 | Casting Tool |
| 7 | UV Lamp |
| 16 | Sheet |
| 17 | Sheet Gripper |
| 18 | Cured Structures (cured composition) on the sheet |

Figure 5:
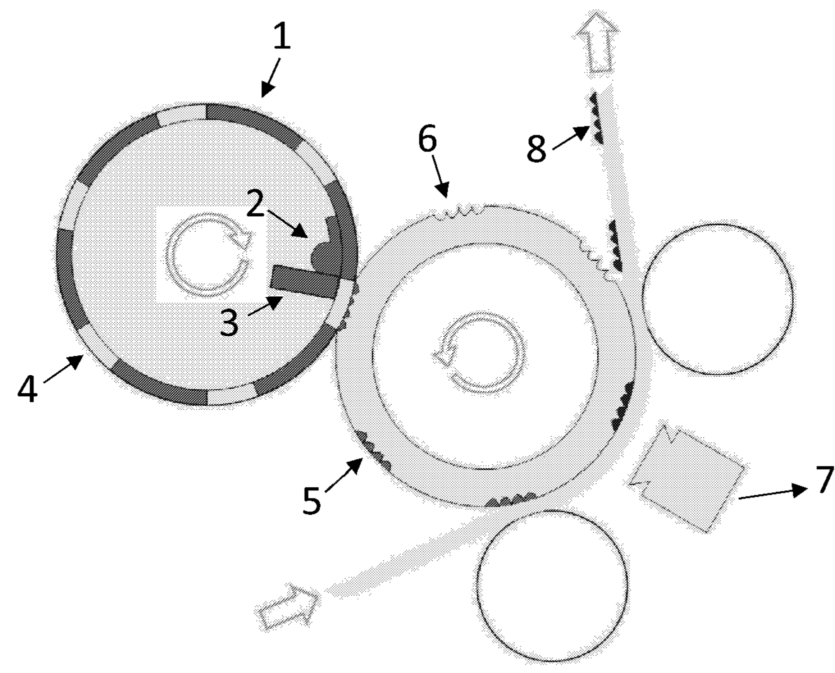
FIG. 5 shows an alternative embodiment where the radiation curable composition is applied directly to the casting tool.

FIG. 5 shows an alternative embodiment where the radiation curable composition is applied directly to the casting tool.

The numbers in FIG. 5 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |

The following FIGS. 6-12) show the addition of further printing units either pre or post the units in FIGS. 1 and 5.

The further printing units could for example either apply print elements or images that cooperate with the surface relief structures to provide an additional security benefit or they could provide an independent aesthetic design or security feature. The surface relief structure is described above.

In a preferred embodiment where the surface relief structure is a focusing and/or magnifying element an additional printing unit can be used to form an image array on which the focussing elements are to focus and the magnifying elements are to magnify to generate a secure optical effect.

In a preferred embodiment the printing press will enable the provision of a focussing element array and an image array located approximately in the focal plane of the focussing element array such that the focussing element array exhibits a substantially focussed image of the image array. This focussed image may preferably be optically variable and could for example be based on any of the mechanisms detailed below. It should be appreciated the focussing element array and image array could optionally be configured to provide any one or more of these effects, un-less otherwise specified:

Moire magnifier devices (examples of which are described in EP-A-1695121, WO-A-94/27254, WO-A-2011/107782 and WO2011/107783) make use of an array of focussing elements (such as lenses or mirrors) and a corresponding array of microimages, wherein the pitches of the focussing elements and the array of microimages and/or their relative locations are mismatched with the array of focussing elements such that a magnified version of the microimages is generated due to the moire effect. Each microimage is a complete, miniature version of the image which is ultimately observed, and the array of focussing elements acts to select and magnify a small portion of each underlying microimage, which portions are combined by the human eye such that the whole, magnified image is visualised. This mechanism is sometimes referred to as "synthetic magnification". The magnified array appears to move relative to the device upon tilting and can be configured to appear above or below the surface of the device itself. The degree of magnification depends, inter alia, on the degree of pitch mismatch and/or angular mismatch between the focussing element array and the microimage array.

Integral imaging devices are similar to moire magnifier devices in that an array of microimages is provided under a corresponding array of lenses, each microimage being a miniature version of the image to be displayed. However here there is no mismatch between the lenses and the microimages. Instead a visual effect is created by arranging for each microimage to be a view of the same object but from a different viewpoint. When the device is tilted, different ones of the images are magnified by the lenses such that the impression of a three-dimensional image is given.

"Hybrid" devices also exist which combine features of moire magnification devices with those of integral imaging devices. In a "pure" moire magnification device, the microimages forming the array will generally be identical to one another. Likewise in a "pure" integral imaging device there will be no mismatch between the arrays, as described above. A "hybrid" moire magnifica-tion/integral imaging device utilises an array of microimages which differ slightly from one another, showing different views of an object, as in an integral imaging device. However, as in a moire magnification device there is a mismatch between the focussing element array and the microimage array, resulting in a synthetically magnified version of the microimage array, due to the moire effect, the magnified microimages having a three-dimensional appearance. Since the visual effect is a result of the moire effect, such hybrid devices are considered a subset of moire magnification devices for the purposes of the present disclosure. In general, therefore, the microimages provided in a moire magnification device should be substantially identical in the sense that they are either exactly the same as one another (pure moire magnifiers) or show the same object/scene but from different viewpoints (hybrid devices).

Moire magnifiers, integral imaging devices and hybrid devices can all be configured to operate in just one dimension (e.g. utilising cylindrical lenses) or in two dimensions (e.g. comprising a 2D array of spherical or aspherical lenses).

Lenticular devices on the other hand do not rely upon magnification, synthetic or otherwise. An array of focussing elements, typically cylindrical lenses, overlies a corresponding array of image sections, or "slices", each of which depicts only a portion of an image which is to be displayed. Image slices from two or more different images are interleaved and, when viewed through the focussing elements, at each viewing angle, only selected image slices will be directed towards the viewer. In this way, different composite images can be viewed at different angles. However it should be appreciated that no magnification typically takes place and the resulting image which is observed will be of substantially the same size as that to which the underlying image slices are formed. Some examples of lenticular devices are described in U.S. Pat. No. 4,892,336, WO-A-2011/051669, WO-A-2011051670, WO-A-2012/027779 and U.S. Pat. No. 6,856,462. More recently, two-dimensional lenticular devices have also been developed and examples of these are disclosed in British patent application numbers 1313362.4 and 1313363.2. Lenticular devices have the advantage that different images can be displayed at different viewing angles, giving rise to the possibility of animation and other striking visual effects which are not possible using the moire magnifier or integral imaging techniques.

Arrays of lenses or other focussing elements can also be used as a security device on their own (i.e. without a corresponding image array), since they can be used to exhibit a magnified or dis-torted view of any background they may be placed against, or scene viewed therethrough. This effect cannot be replicated by photocopying or similar.

Figure 6:
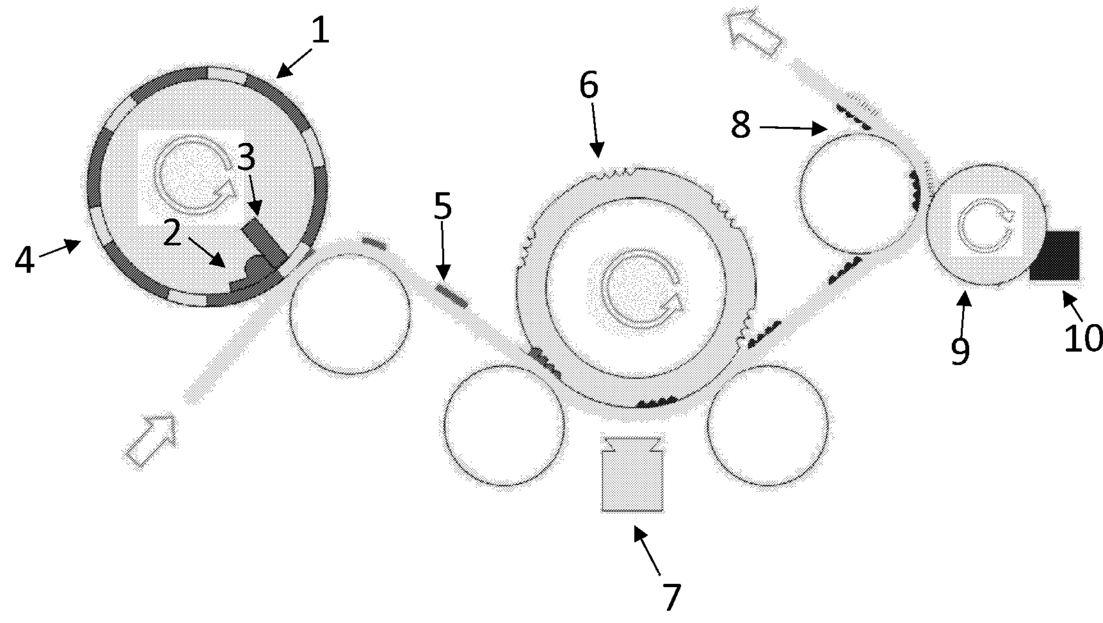
FIG. 6 illustrates the use of a gravure printing unit to provide an additional printing step on the opposite side of the substrate.

FIG. 6 illustrates the use of a gravure printing unit to provide an additional printing step on the opposite side of the substrate. This would enable the use of the focussing elements as de-scribed above.

The numbers in FIG. 6 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |
| 9 | Gravure Cylinder |
| 10 | Chambered Doctor Blade |

Figure 7:
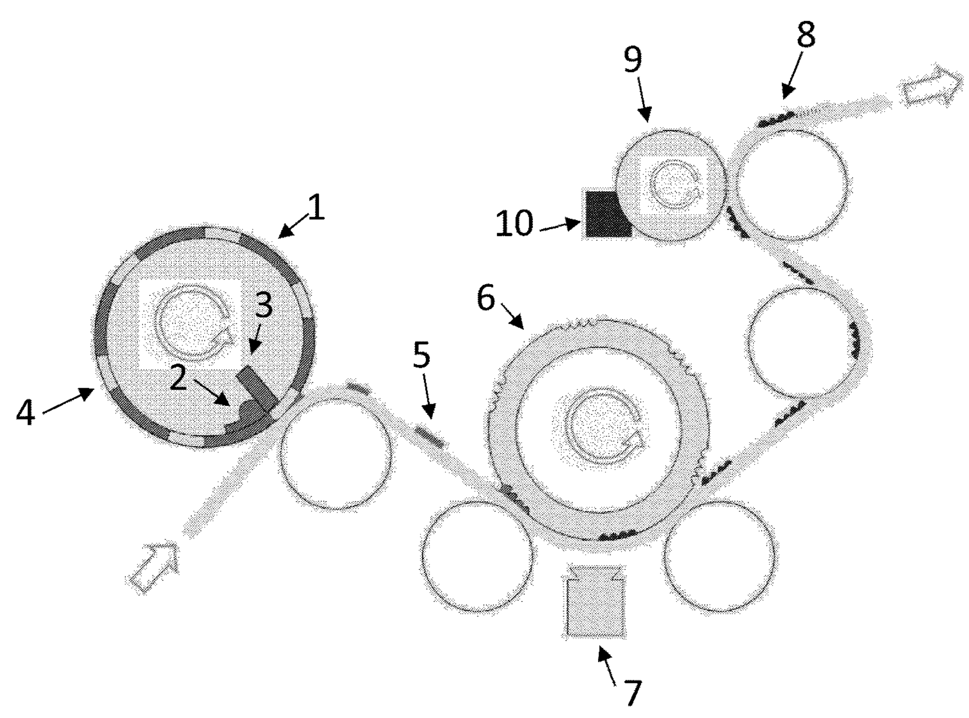
FIG. 7 illustrates the use of a gravure printing unit to provide an additional printing step on the same side of the substrate.

FIG. 7 illustrates the use of a gravure printing unit to provide an additional printing step on the same side of the substrate.

The numbers in FIG. 7 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |
| 9 | Gravure Cylinder |
| 10 | Chambered Doctor Blade |

Figure 8:
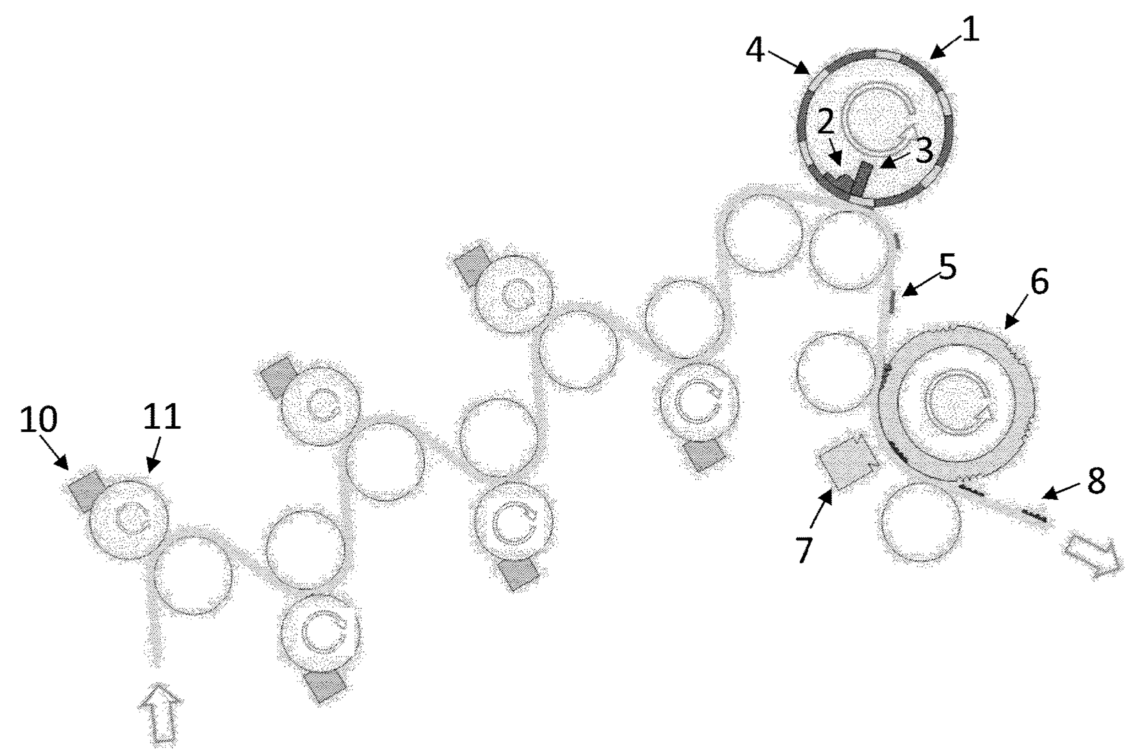
FIG. 8 illustrates the possibility of using one or more multiple gravure heads prior to the creation of the surface relief structure.

FIG. 8 illustrates the possibility of using one or more multiple gravure heads prior to the creation of the surface relief structure. The gravure heads can be configured to apply the opacifying layers for the production of a polymer banknote substrate. The gravure heads can also be positioned after the creation of the surface relief structure.

The numbers in FIG. 8 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |
| 9 | Gravure Cylinder |
| 10 | Chambered Doctor Blade |

Figure 9:
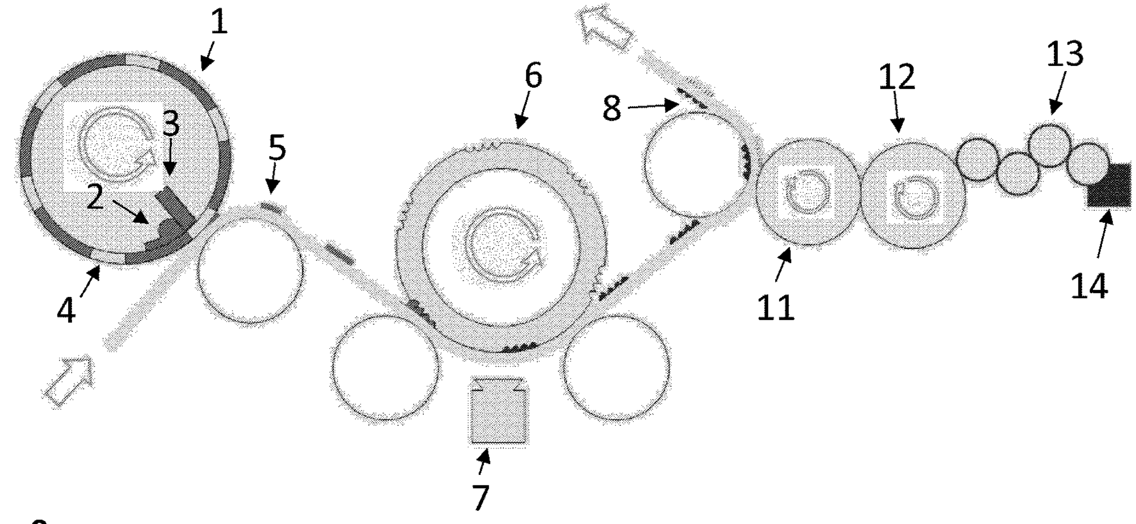
FIG. 9 illustrates the use of an offset print process (one single colour) to provide an additional printing step on the opposite side of the substrate.

FIG. 9 illustrates the use of an offset print process (one single colour) to provide an additional printing step on the opposite side of the substrate.

The numbers in FIG. 9 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |
| 11 | Print Blanket |
| 12 | Print Plate |
| 13 | Inking Rollers |
| 14 | Ink Duct |

Figure 10:
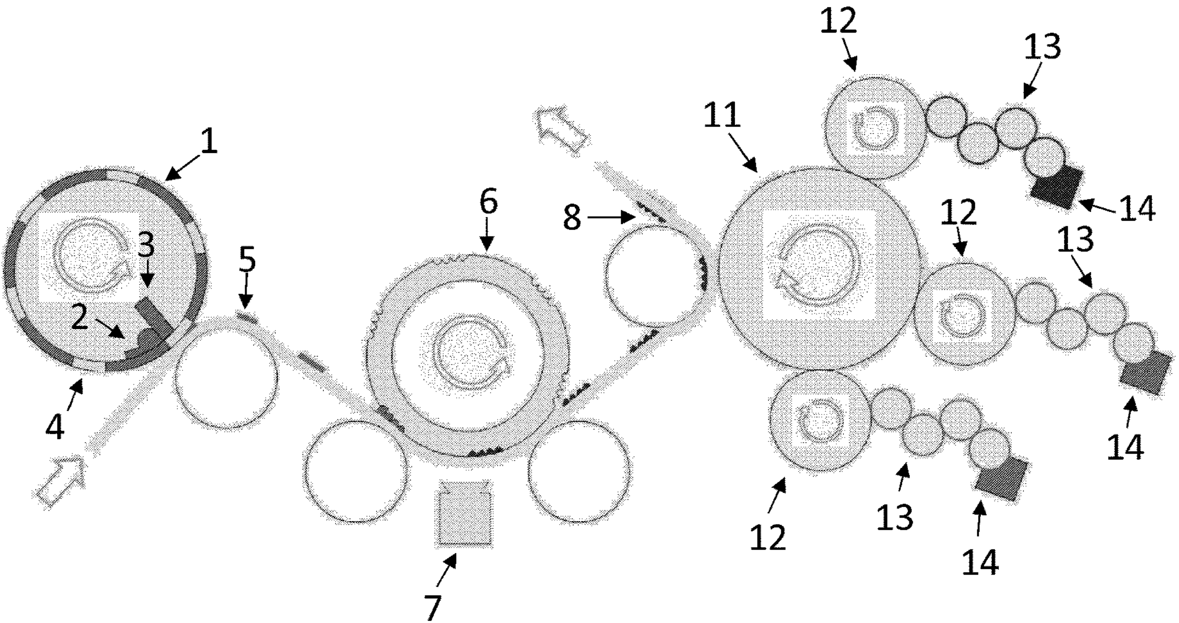
FIG. 10 illustrates the use of an offset print process (multi coloured) to provide an additional printing step on the opposite side of the substrate.

FIG. 10 illustrates the use of an offset print process (multi coloured) to provide an additional printing step on the opposite side of the substrate.

The numbers in FIG. 10 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |
| 11 | Print Blanket |
| 12 | Print Plate |
| 13 | Inking Rollers |
| 14 | Ink Duct |

Figure 11:
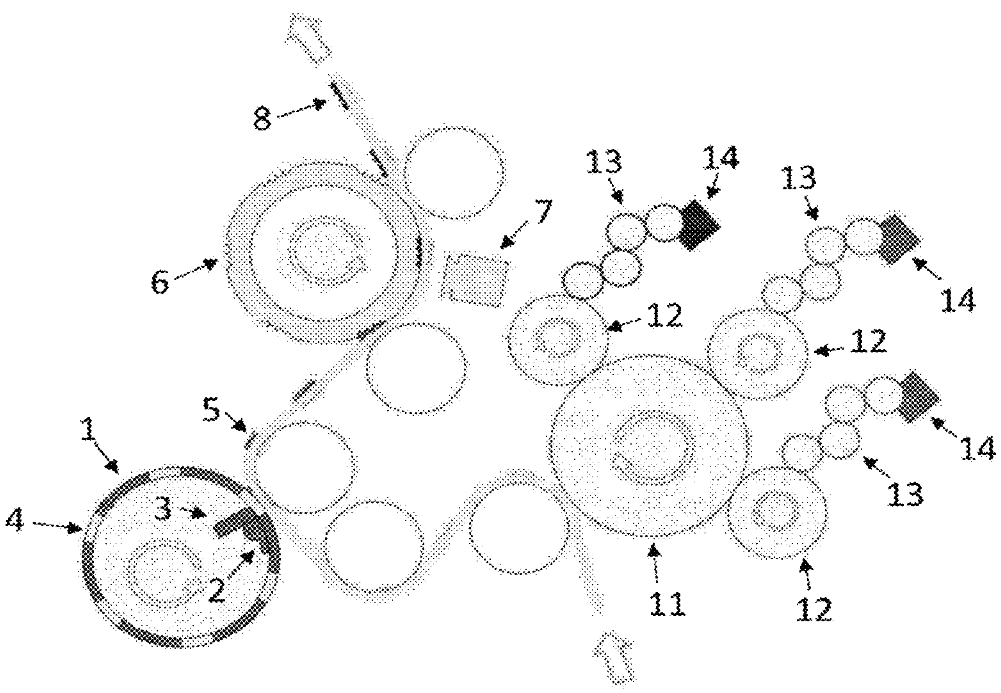
FIG. 11 illustrates the possibility of using a three colour offset printing process prior to the creation of the surface relief structure.

FIG. 11 illustrates the possibility of using a three colour offset printing process prior to the creation of the surface relief structure. In this embodiment the print is applied on the opposite side of the web to the surface relief structure.

The numbers in FIG. 11 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |
| 11 | Print Blanket |
| 12 | Print Plate |
| 13 | Inking Rollers |
| 14 | Ink Duct |

Figure 12:
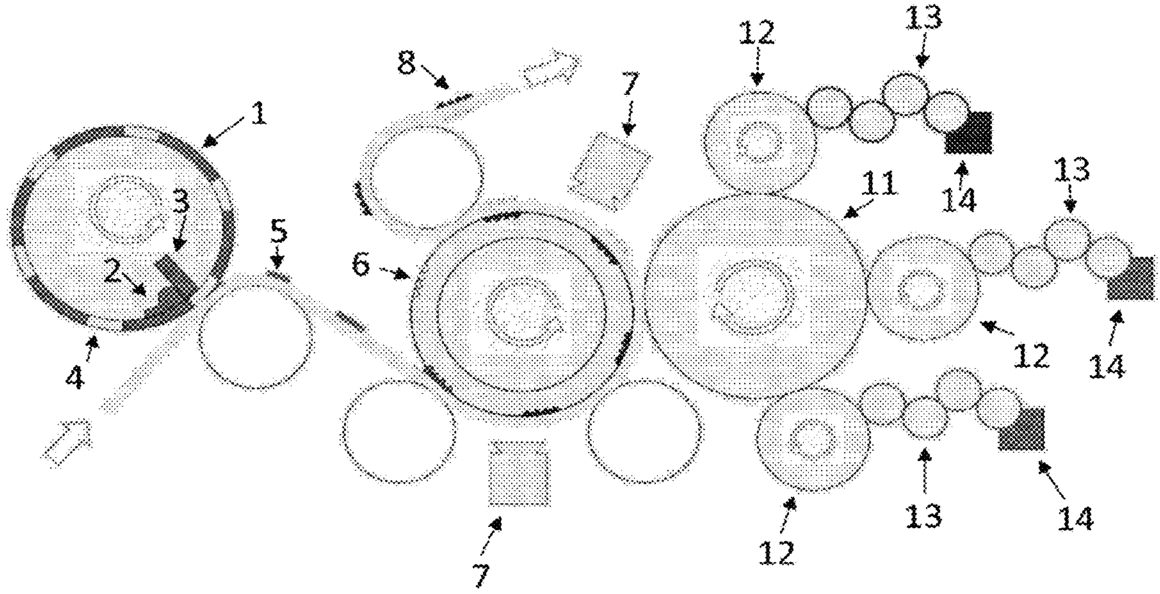
FIG. 12 illustrates the use of an offset print process (one single colour) to provide an additional printing step on the opposite side of the substrate, wherein the additional print is applied when the web is in-between the print blanket and the casting tool and therefore the print process is simultaneous with the casting process.

FIG. 12 illustrates the use of an offset print process (one single colour) to provide an additional printing step on the opposite side of the substrate, wherein the additional print is applied when the web is in-between the print blanket and the casting tool and therefore the print process is simultaneous with the casting process.

The numbers in FIG. 12 have the following meanings:

| | |
|---|---|
| 1 | Screen |
| 2 | Radiation curable composition |
| 3 | Squeegee |
| 4 | Exposed Mesh |
| 5 | Uncured radiation curable composition |
| 6 | Casting Tool |
| 7 | UV Lamp |
| 8 | Cured Structures (cured composition) |
| 11 | Print Blanket |
| 12 | Print Plate |
| 13 | Inking Rollers |
| 14 | Ink Duct |

The present invention is now described in more details with reference to non-limiting examples. The Examples below provide more details for the preparation and properties of the radiation curable compositions according to the present invention.

EXAMPLES

Below, inventive radiation curable compositions are shown (all components are given in % by weight):

Example 1

| Cast curing lacquer based on a UV-curable composition | % by weight |
|---|---|
| Bisphenol A epoxyacrylate with 25% TPGDA[1] | 1-35 |
| Dipropylene glycol diacrylate (DPGDA)[2] | 30-45 |
| Ethoxylated trimethylol propane triacrylate (TMEOPTA)[3] | 10-50 |
| Rheology additive[4] | 0.5-3 |
| Silicone free defoamer[5] | 0.5-1.5 |
| Photoinitiator blend: Bis(2,4,6-trimethylbenzoyl)phenyl-phosphine oxide/4-phenyl benzophenone/2-hydroxy-1-{4-[4-(2-hydroxy-2-methylpropanoyl)phenoxy]phenyl}-2-methylpropan-1-one | 5-10 |

[1] Ebecryl 605 ® (Epoxyacryl + 25% TPGDA)
[2] Laromer ® DPGDA
[3] Laromer ® LR8863 (TMPEOTA)
[4] Rheobyk ® 7410
[5] EFKA ® PB2770

Example 2 (with Adhesion Promoter)

| Cast curing lacquer based on a UV-curable composition | % by weight |
|---|---|
| Bisphenol A epoxyacrylate with 25% TPGDA[1] | 1-35 |
| Dipropylene glycol diacrylate (DPGDA)[2] | 30-45 |
| Ethoxylated trimethylol propane triacrylate (TMEOPTA)[3] | 10-50 |
| Rheology additive[4] | 0.5-3 |

-continued

| Cast curing lacquer based on a UV-curable composition | % by weight |
|---|---|
| Adhesion promoter | 0.2-2 |
| Silicone free defoamer[5)] | 0.5-1.5 |
| Photoinitiator blend: Bis(2,4,6-trimethylbenzoyl)phenyl-phosphine oxide/4-phenyl benzophenone/2-hydroxy-1-{4-[4-(2-hydroxy-2-methylpropanoyl)phenoxy]phenyl}-2-methylpropan-1-one | 5-10 |

[1)]Ebecryl ® 605 (Epoxyacryl + 25% TPGDA)
[2)]Laromer ® DPGDA
[3)]Laromer ® LR8863 (TMPEOTA)
[4)]Rheobyk ® 7410
[5)]EFKA ® PB2770

Example 3

| Cast curing lacquer based on a UV-curable composition | % by weight |
|---|---|
| Bisphenol A epoxyacrylate with 25% TPGDA[1)] | 1-35 |
| Dipropylene glycol diacrylate (DPGDA)[2)] | 30-45 |
| Ethoxylated trimethylol propane triacrylate (TMEOPTA)[3)] | 10-50 |
| Rheology additive[4)] | 0.5-3 |
| Silicone free defoamer[5)] | 0.5-1.5 |
| Photoinitiator blend: Bis(2,4,6-trimethylbenzoyl)phenyl-phosphine oxide/4-phenyl benzophenone 2-hydroxy-1-{4-[4-(2-hydroxy-2-methylpropanoyl)phenoxy]phenyl}-2-methylpropan-1-one | 5-10 |

[1)]Ebecryl ® 605 (Epoxyacryl + 25% TPGDA)
[2)]Laromer ® DPGDA
[3)]Laromer ® LR8863 (TMPEOTA)
[4)]Aerosil ® 200
[5)]EFKA ® PB2770

Example 4 (with Adhesion Promoter)

| Cast curing lacquer based on a UV-curable composition | % by weight |
|---|---|
| Bisphenol A epoxyacrylate with 25% TPGDA[1)] | 1-35 |
| Dipropylene glycol diacrylate (DPGDA)[2)] | 30-45 |
| Ethoxylated trimethylol propane triacrylate (TMEOPTA)[3)] | 10-50 |
| Rheology additive[4)] | 0.5-3 |
| Adhesion promoter | 0.2-2 |
| Silicone free defoamer[5)] | 0.5-1.5 |
| Photoinitiator blend: Bis(2,4,6-trimethylbenzoyl)phenyl-phosphine oxide/4-phenyl benzophenone/2-hydroxy-1-{4-[4-(2-hydroxy-2-methylpropanoyl)phenoxy]phenyl}-2-methylpropan-1-one | 5-10 |

[1)]Ebecryl ® 605 (Epoxyacryl + 25% TPGDA)
[2)]Laromer ® DPGDA
[3)]Laromer ® LR8863 (TMPEOTA)
[4)]Aerosil ® 200
[5)]EFKA ® PB2770

The viscosity of the compositions according to examples 1 to 4 at 35° C. is between 15 to 35 Pa S at a shear rate of 0.1 $s^{-1}$ and the viscosity at 35° C. is <0.15 Pa S at a shear rate of 1000 $s^{-1}$.

The viscosity was determined according to ISO 3219-2: 2021, by a TA Instruments AR-2000 Rheometer using a truncated cone of 60 mm 2° stainless steel and plate geometry, and measurements are conducted in the rotational mode using shear rate control.

Printing Example

A 75 micron PET foil (Hostaphan® RNK) is overprinted by rotary screen printing with an UV curable composition according to examples 1 to 4. The screen used is a 145 mesh screen. There is no unwanted leakage of the UV curable composition through the screen mesh when in use or at rest, and resin is only passed through the screen when printed in normal operation.

Subsequently the UV curable composition prior to curing is cast with a temperature regulated steel based roller that is electroless or galvanically plated with nickel, which has 12-14% phos-phorous content, and contains a structure corresponding to an array of cylindrical lenses with a typical radius of 17 micron and a typical pitch of 60 micron. The casting is carried out under pressure, in a range 100-1000 N/m) with the cast roller heated to 50deg C.

The UV resin is cured whilst in contact with the casting tool, the curing is carried out by a Phoseon UV LED lamp, namely a FireJet FJ200 with a lamp size of 150×20 mm at 385 nm wavelength, with a peak irradiance of 12 W/cm2. The lamp is ran at 100% power intensity. The press is ran at a speed of 80m/m.

The process and separation of the substrate from the casting tool can be carried out without any difficulties, producing the lenticular lens structure on the substrate.

The invention claimed is:

1. A radiation curable screen printing composition for cast-curing comprising a) one or more compounds comprising radiation curable groups as component A, b) one or more photoinitiators as component B, c) one or more rheology modifying agents as component C, d) optionally one or more defoaming agents as component D, e) optionally one or more adhesion promoters as component E, f) optionally one or more functional material, as component F, which composition has a shear rate dependent viscosity, wherein the viscosity at 35° C. is 15 to 40 PaS at a shear rate of 0.1 $s^{-1}$ and the viscosity at 35° C. is <0.15 PaS at a shear rate of 1000 $s^{-1}$, determined according to ISO 3219-2:2021, by a TA Instruments AR-2000 Rheometer using a truncated cone of 60 mm 2° stainless steel and plate geometry, and measurements are conducted in the rotational mode using shear rate control.

2. The radiation curable composition according to claim 1, wherein component A comprises a1) one or more (meth)acrylates, and/or a2) one or more cycloaliphatic epoxides.

3. The radiation curable composition according to claim 2, wherein the one or more (meth)acrylates are a1i) one or more epoxy (meth)acrylates, polyester acrylates and/or polyether acrylates as component A1, and a1ii) one or more monofunctional or multifunctional (meth)acrylates as component A2.

4. The radiation curable composition according to claim 3, wherein the epoxy (meth)acrylates A1 are (meth)acrylates based on aromatic or aliphatic glycidyl ethers, alkylation products of phenol/dicyclopentadiene, phenol-based epoxy novolaks, and cresol-based epoxy novolaks, 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane, diglycidyl ether of polypropylene glycol (α,ω-bis(2,3-epoxypropoxy)poly(oxypropylene), and of hydrogenated bisphenol A (2,2-bis[4-(2,3-epoxypropoxy)cyclohexyl]propane), and mixtures thereof.

5. The radiation curable composition according to claim 3, wherein the monofunctional or multifunctional (meth) acrylates A2 are selected from the group consisting of trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetra methacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, triacrylate of singly to vigintuply alkoxylated, trimethylolpropane, singly to vigintuply propoxylated glycerol or singly to vigintuply ethoxylated and/or propoxylated pentaerythritol, and mixtures thereof.

6. The radiation curable composition according to claim 2, wherein the one or more cycloaliphatic epoxides comprising at least one cyclohexane group, and at least two epoxide groups is represented by the following formula (I)

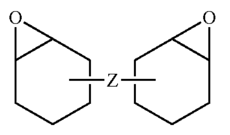

(I)

wherein

Z represents a single bond, a straight- or branchedchain $C_1$-$C_{18}$alkylene group, a divalent alicyclic hydrocarbon group, a cycloalkylene group, —CO—, —O—CO—O—, —COO— or —O—.

7. The radiation curable composition according to claim 1, wherein the photoinitiator B is selected from the group consisting of alpha-hydroxy ketone compounds, alpha-alkoxyketone compounds, alpha-aminoketone compounds, benzophenone compounds, acylphosphine oxide compounds, and blends of two or more of the aforementioned compounds.

8. The radiation curable composition according to claim 1, wherein the rheology modifying agent is a non associative rheology modifying agent.

9. The radiation curable composition according to claim 1, wherein the defoaming agent D is a silicon free defoaming agent.

10. The radiation curable composition according to claim 1, wherein the adhesion promoter E is at least one radiation-curable compound having at least one, free acid group or a copolymerizable amine.

11. The radiation curable composition according to claim 3 comprising ai) 1 to 58.5% by weight of component A1, and
aii) 40 to 95% by weight of component A2,
b) 1 to 10% by weight of component B,
c) 0.5 to 3% by weight of component C,
d) 0 to 1.5% by weight of component D,
e) 0 to 2% by weight of component E, and
f) 0 to 50% by weight of component F.

12. The radiation curable composition according to claim 1, wherein the cured composition is transparent.

13. An article comprising a substrate and a coating comprising a radiation cured composition according to claim 1, wherein the coating is in form of a surface relief structure.

14. A method for producing the article according to claim 13 comprising the steps:

i) providing a casting tool having a relief structure defined in a surface thereof, the relief structure corresponding to the surface relief structure;
ii) applying to the substrate and/or the relief structure of the casting tool the radiation curable composition according to claim 1;
iii) casting the radiation cured composition according by bringing the substrate into contact with a casting tool comprising a relief structure and forming the surface relief structure in the coating composition; and
iv) radiation curing the coating composition such that the surface relief structure formed of the radiation curable composition is retained on the substrate.

15. The method according to claim 14, wherein the surface relief structure is present in form of a nanostructure or microstructure.

16. The method according to claim 14, comprising the following step after radiation curing in step iv):

v) separation of the substrate and the casting tool.

17. The method according to claim 14, wherein i) the casting tool in step i) is provided with a die form, the die form having a surface comprising an arrangement of raised areas and recessed areas defining the raised elements of the surface relief structure;
ii) in step ii) the radiation curable composition is applied to the surface of the die form such that the radiation curable composition substantially fills the recessed areas;
iii) bringing in step iii) the substrate into contact with the surface of the die form such that it covers the recessed areas;
iv) fully or partially curing the coating composition in step iv) such that the radiation curable composition in the recessed areas is removed from said recessed areas and retained on the substrate; and
v) separating the substrate from the surface of the die form.

18. The method according to claim 14, wherein the substrate is present in form of sheets.

19. The method according to claim 14, wherein the radiation curable composition is applied to the substrate in step ii) by screen printing.

20. The method according to claim 14, wherein the surface relief structure is one of a diffractive structure; one or more micro-optic element, magnifying elements, faceted elements, reflective elements, or caustic elements; or a macro-structure.

21. Security article comprising at least one article according to claim 13.

22. The security article according to claim 21, wherein the security article is in form of a security document.

23. The security article according to claim 21, wherein the security article is a security thread, strip, insert, foil or patch.

24. A printing press comprising the radiation curable composition according to claim 1, wherein the printing press is adapted to carry out printing on a web-like or sheet-like substrate, in particular for the production of security documents, comprising a printing unit, preferably a screen-printing unit, the printing press further comprises an in-line casting device comprising an casting tool (6) and a radiation source (7), wherein the printing unit is designed to apply the radiation curable composition (2) to the substrate and/or the casting tool and the inline-casting device is adapted to replicate and form a surface relief structure in the radiation curable composition.

* * * * *